(12) United States Patent
Okuyoshi et al.

(10) Patent No.: US 8,252,474 B2
(45) Date of Patent: Aug. 28, 2012

(54) FUEL CELL SYSTEM

(75) Inventors: Masahiro Okuyoshi, Toyota (JP);
Masaaki Matsusue, Mishima (JP);
Masashi Toida, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 18 days.

(21) Appl. No.: 13/163,083

(22) Filed: Jun. 17, 2011

(65) Prior Publication Data
US 2011/0244350 A1 Oct. 6, 2011

Related U.S. Application Data

(63) Continuation of application No. PCT/JP2008/073791, filed on Dec. 26, 2008.

(51) Int. Cl.
*H01M 8/06* (2006.01)
*H01M 8/04* (2006.01)

(52) U.S. Cl. ......... 429/450; 429/414; 429/428; 429/429

(58) Field of Classification Search ................. 429/428, 429/450
See application file for complete search history.

(56) References Cited

U.S. PATENT DOCUMENTS

2002/0009623 A1* 1/2002 St-Pierre et al. ............. 429/13

FOREIGN PATENT DOCUMENTS

| JP | 2004-111196 A | 4/2004 |
|---|---|---|
| JP | 2004-207139 A | 7/2004 |
| JP | 2004-335444 A | 11/2004 |
| JP | 2005-222854 A | 8/2005 |
| JP | 2006-196262 A | 7/2006 |
| JP | 2007-035389 A | 2/2007 |
| JP | 2007-287547 A | 11/2007 |
| JP | 2008-041505 A | 2/2008 |
| JP | 2008-091329 A | 4/2008 |
| JP | 2008-140734 A | 6/2008 |
| JP | 2009-004151 A | 1/2009 |

OTHER PUBLICATIONS

International Search Report issued Apr. 28, 2009 in PCT/JP2008/073791.
International Search Report mailed Apr. 28, 2009 of PCT/JP2008/073791.
IPRP of PCT/JP2008/073791 issued Aug. 16, 2011.

* cited by examiner

*Primary Examiner* — Barbara Gilliam
*Assistant Examiner* — Steven Scully
(74) *Attorney, Agent, or Firm* — Kenyon & Kenyon LLP

(57) ABSTRACT

An object of the invention is to provide a fuel cell system capable of improving accuracy of water content estimation during a standstill.
A fuel cell system includes a fuel cell having a plurality of single cells laminated together and an estimating unit for estimating residual water content distributions in a fuel gas flow channel and an oxidation gas flow channel and a moisture content distribution in an electrolyte membrane in a cell plane of each single cell while taking into consideration water transfer that occurs between an anode electrode and a cathode electrode via the electrolyte membrane. The estimating unit estimates a residual water content of the fuel gas flow channel during a standstill from a shutdown to a restart of the fuel cell system based on temperature information on each single cell acquired during the standstill. In addition, the fuel cell system is capable of executing a scavenging process on the fuel gas flow channel when the residual water content of the fuel gas flow channel estimated during the standstill exceeds a predetermined threshold.

9 Claims, 20 Drawing Sheets

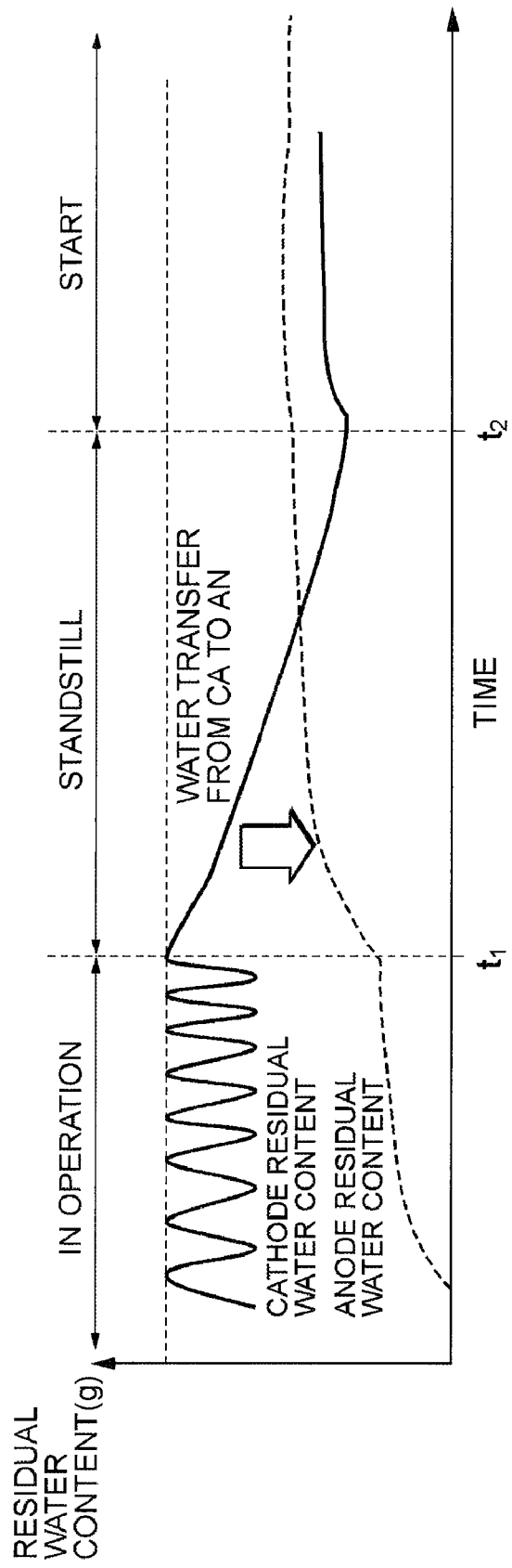

FUEL CELL SYSTEM

This is a by-pass continuation of International Application No. PCT/JP2008/073791 filed 26 Dec. 2008, the content of which is incorporate herein by reference.

FIELD OF THE INVENTION

The present invention relates to a fuel cell system that estimates a water content of a proton-exchange membrane fuel cell.

BACKGROUND OF THE INVENTION

As is conventionally well known, efficient power generation by a proton-exchange membrane fuel cell desirably involves keeping an electrolyte membrane in a moderately wet condition and preventing a water content inside the fuel cell from becoming deficient or excessive. An example of a known technique for controlling the water content in a cell plane of a fuel cell is described in Patent Document 1 (Japanese Patent Laid-Open No. 2004-335444). Patent Document 1 discloses controlling the distribution of water content as droplets or water vapor in a cell plane by adjusting at least one of pressure, humidity, temperature, and flow rate of a reactant gas (a general term for oxidation gas typified by air and fuel gas typified by hydrogen gas) and pressure drop characteristics defined by flow channel geometry.

SUMMARY OF THE INVENTION

Problems to be Solved by the Invention

However, in an actual single cell, transfer of water through an electrolyte membrane occurs between an anode electrode and a cathode electrode. In this regard, Patent Document 1 does not consider water transfer between electrodes and thus it is difficult for Patent Document 1 to accurately estimate and control water content distribution in a cell plane.

Further, Patent Document 1 dose not disclose estimating and controlling water content distribution during a standstill after shutdown of a fuel cell system. In fact, in a fuel cell system during a standstill, a difference in water vapor partial pressure (temperature difference) causes water accumulated on the cathode electrode-side to be transferred to the anode electrode-side via the electrolyte membrane. As a result, there may be cases where, upon a next start-up of the fuel cell system, the anode electrode-side flow channel has a high residual water content and is therefore in a state in which a pressure drop thereof is high. Accordingly, there is a possibility that, upon restart, a supply of hydrogen gas to the anode electrode becomes deficient and causes deterioration of an MEA of a single cell.

It is an object of the present invention to provide a fuel cell system capable of improving accuracy of water content estimation during a standstill.

Means for Solving the Problems

In order to achieve the object described above, a fuel cell system according to the present invention includes: a fuel cell having a plurality of single cells laminated together, each of the single cells having an anode electrode, a cathode electrode, an electrolyte membrane between the anode electrode and the cathode electrode, a fuel gas flow channel for supplying fuel gas to the anode electrode, and an oxidation gas flow channel for supplying oxidation gas to the cathode electrode; and an estimating unit for estimating residual water content distributions in the fuel gas flow channel and the oxidation gas flow channel and a moisture content distribution in the electrolyte membrane in a cell plane of each single cell while taking into consideration water transfer that occurs between the anode electrode and the cathode electrode via the electrolyte membrane. The estimating unit estimates a residual water content of the fuel gas flow channel during a standstill from a shutdown to a restart of the fuel cell system based on temperature information on each single cell acquired during the standstill.

According to the present invention, since water transfer between electrodes is taken into consideration, the estimation accuracy of a residual water content distribution and a moisture content distribution can be improved not only in a cell plane but also in a cell lamination direction. In addition, by acquiring temperature information during the standstill, water transfer during the standstill can be accurately determined and a residual water content of the fuel gas flow channel can be accurately estimated. Consequently, for example, in a case of a high residual water content, it is possible that a countermeasure control thereof is adequately performed before a restart of the fuel cell system.

In the following description, a shutdown, a standstill, and a restart of the fuel cell system may sometimes be respectively abbreviated to "system shutdown," "system standstill," and "system restart."

Preferably, the fuel cell system further may include a temperature sensor that detects temperatures related to the fuel cell, wherein the estimating unit may calculate a temperature of each single cell using one of the temperatures detected by the temperature sensor.

Consequently, temperature information of each single cell can be acquired while reducing the number of parts and cost as compared to a case where temperature sensors are individually provided for all single cells.

Preferably, the temperature information may be a temperature profile that represents a temperature variation of each single cell during the standstill.

The present inventors have found that, depending on what kind of temperature profile is to be assumed, a temperature distribution between single cells in the cell lamination direction differs and an amount of water transfer to the fuel gas flow channel due to a temperature difference between electrodes also differs. By acquiring a temperature profile as in the preferable mode described above, changes in the temperature distribution between single cells can be estimated and a residual water content of the fuel gas flow channel during the standstill can be estimated more accurately.

Preferably, the fuel cell system may include an operation control unit that executes a scavenging process on the fuel gas flow channel when the residual water content of the fuel gas flow channel estimated during the standstill exceeds a predetermined threshold.

According to the configuration described above, since residual water in the fuel gas flow channel can be reduced by the scavenging process, the occurrence of flooding in the fuel gas flow channel during system standstill can be suppressed. As a result, a supply shortage of fuel gas upon system restart can be suppressed. In addition, when a scavenging process is to be performed upon system restart or upon system shutdown, the duration of the scavenging process can be reduced.

BRIEF DESCRIPTION OF THE DRAWINGS

FIG. 21 is a diagram illustrating an example of a variation in a residual water content of a single cell over time when a control example according to the embodiment is not executed;

DETAILED DESCRIPTION

Hereinafter, a preferred embodiment of the present invention will be described with reference to the accompanying drawings. First, an overview of a fuel cell system including a fuel cell and a water content estimation apparatus thereof for the fuel cell will be described, followed by a description of an estimation of a water content of a fuel cell and a control example using the estimation. Hereinafter, hydrogen gas will be described as an example of a fuel gas and air will be described as an example of an oxidation gas. A fuel gas and an oxidation gas may collectively be described as a reactant gas.

A. Overview of Fuel Cell

Figure 1:
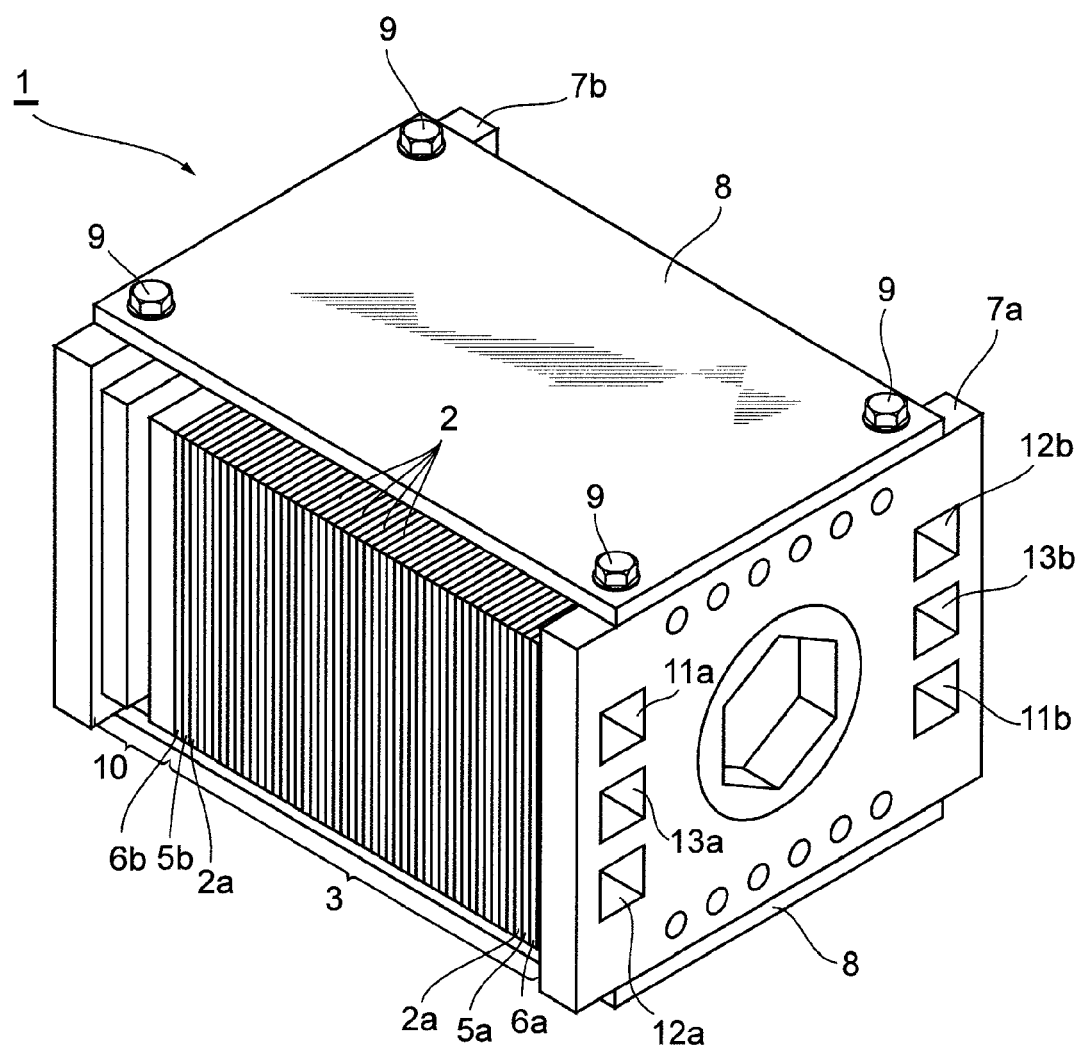
FIG. 1 is a perspective view of a fuel cell according to an embodiment.
Figure 2:
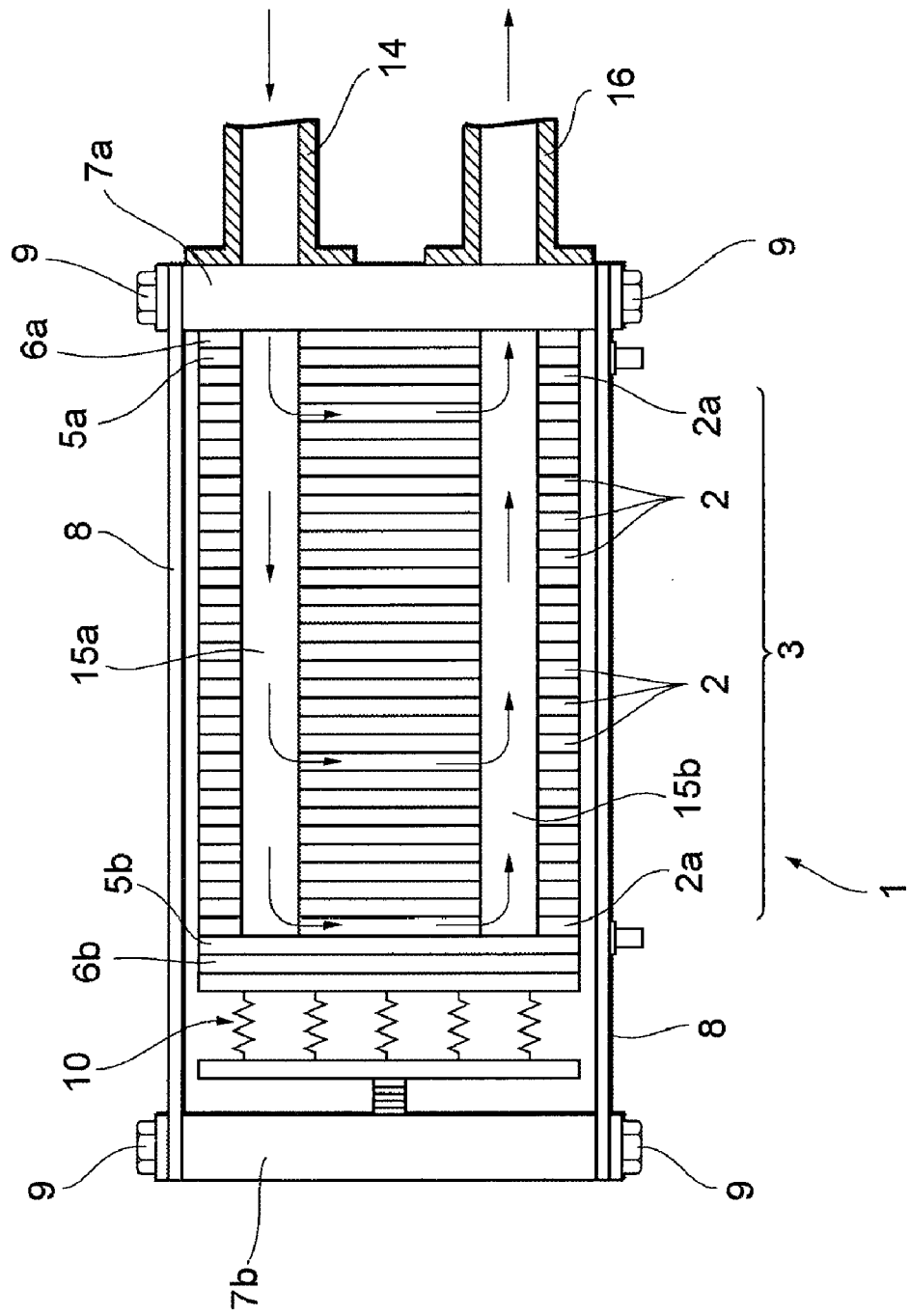
FIG. 2 is a side view of a part of an interior of the fuel cell according to the embodiment.

As illustrated in FIGS. 1 and 2, a fuel cell 1 with a stack structure includes a cell laminate 3 formed by laminating a plurality of single cells 2 of the proton-exchange membrane type. Collector plates 5a, 5b, insulating plates 6a, 6b, and end-plates 7a, 7b are respectively arranged on outer sides of single cells 2 on both ends of the cell laminate 3 (hereinafter, referred to as "end cells 2a"). Tension plates 8, 8 are bridged across the end-plates 7a, 7b and fixed by a bolt 9. An elastic module 10 is provided between the end-plate 7b and the insulating plate 6b.

Hydrogen gas, air, and a coolant are supplied to a manifold 15a inside the cell laminate 3 from a supply pipe 14 connected to supply ports 11a, 12a, and 13a of the end-plate 7a. Subsequently, the hydrogen gas, air, and the coolant flow in a planar direction of the single cell 2 and reach a manifold 15b inside the cell laminate 3, and are discharged to the outside of the fuel cell 1 from an exhaust pipe 16 connected to exhausts 11b, 12b and 13b of the end-plate 7a. Note that although the supply pipe 14, the manifolds 15a, 15b, and the exhaust pipe 16 are provided corresponding to each fluid (hydrogen gas, air, and coolant), same reference characters are assigned in FIG. 2 and descriptions thereof are omitted.

Figure 3:
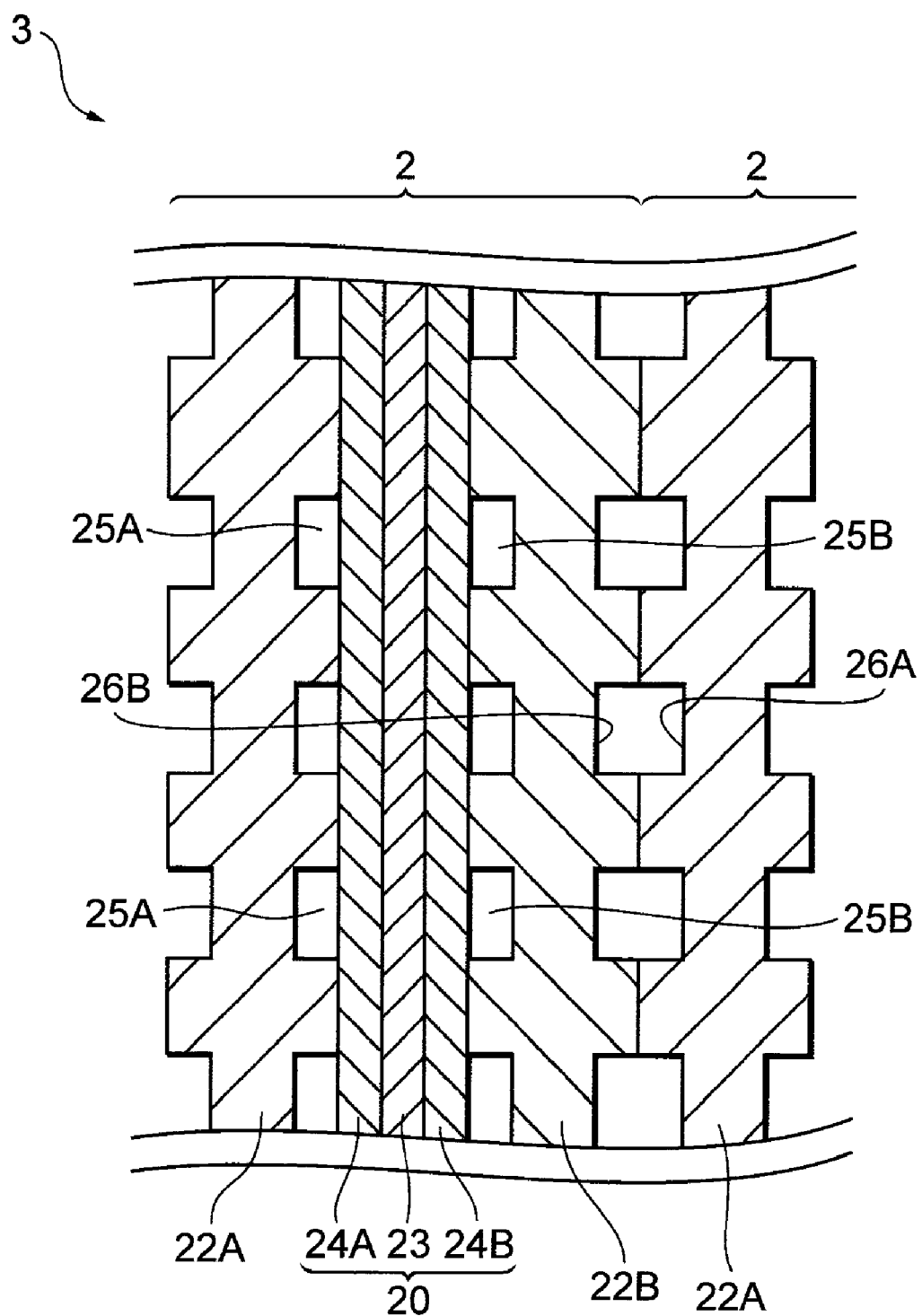
FIG. 3 is a cross-sectional view of a single cell according to the embodiment.

As illustrated in FIG. 3, the single cell 2 includes an MEA 20 and a pair of separators 22A, 22B. The MEA 20 (Membrane Electrode Assembly) is constituted by an electrolyte membrane 23 made of an ion-exchange membrane, and an anode electrode 24A and a cathode electrode 24B which sandwich the electrolyte membrane 23. A hydrogen flow channel 25A of the separator 22A faces the electrode 24A while an air flow channel 25B of the separator 22B faces the electrode 24B. In addition, coolant flow channels 26A, 26B of the separators 22A, 22B communicate with each other between adjacent single cells 2, 2.

Figure 4:
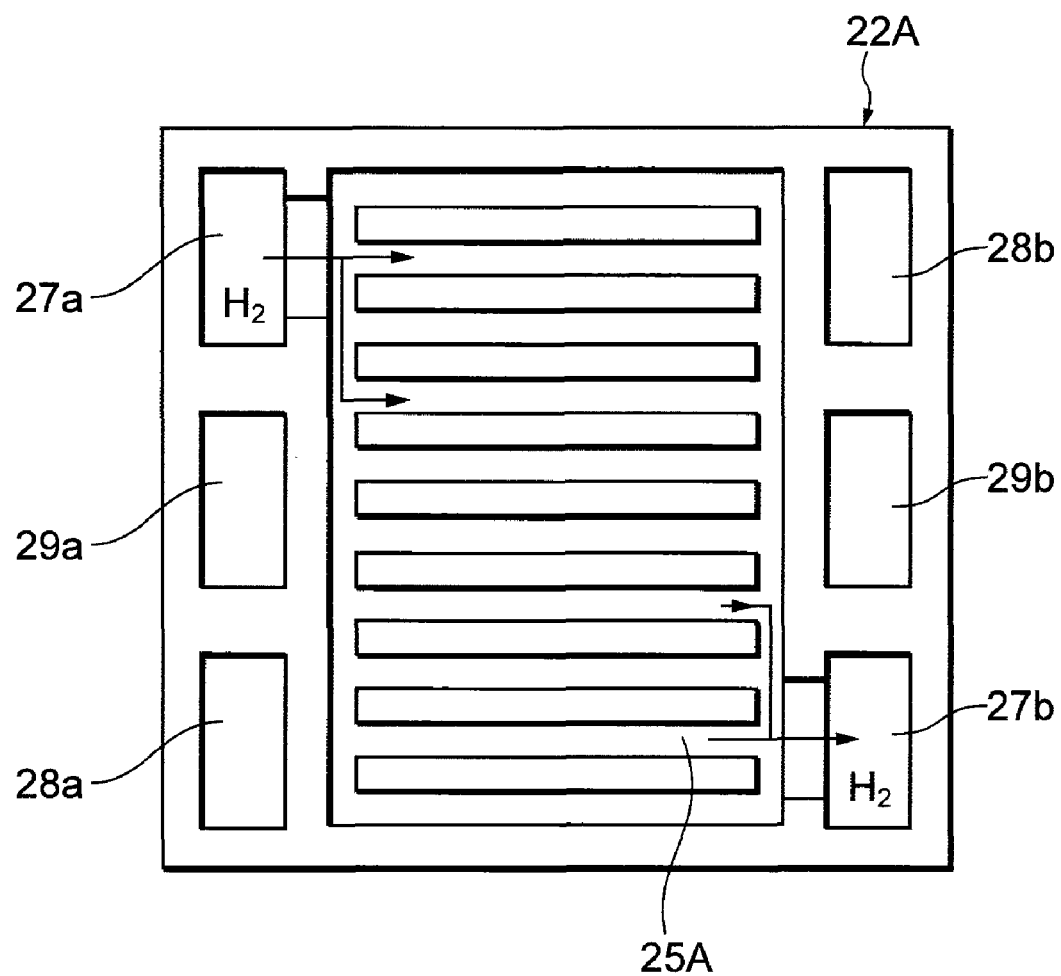
FIG. 4 is a plan view of a separator according to the embodiment.

FIG. 4 is a plan view of the separator 22A. The separator 22A includes a hydrogen inlet 27a, an air inlet 28a, a coolant inlet 29a, a hydrogen outlet 27b, an air outlet 28b, and a coolant outlet 29b respectively penetratingly formed on an outer side of the hydrogen flow channel 25A. Inlets 27a, 28a, and 29a constitute a part of the manifold 15a that corresponds to each fluid. In the same manner, outlets 27b, 28b, and 29b constitute a part of the manifold 15b that corresponds to each fluid. Zone Name: A1,AMD At the separator 22A, hydrogen gas is introduced into a hydrogen flow channel 41 from the inlet 27a and discharged to the outlet 27b. The coolant flows in a similar manner. In addition, while a detailed description will not be given, air also flows in a planar direction in the separator 22B configured similar to the separator 22A. In this manner, hydrogen gas and air are supplied to the electrodes 24A, 24B in the single cell 2 to cause an electrochemical reaction inside the MEA 20 which produces electromotive force. Furthermore, the electrochemical reaction also generates water and heat on the side of the electrode 24B. The heat at each single cell 2 is reduced due to subsequent flow of the coolant.

Figure 5A:
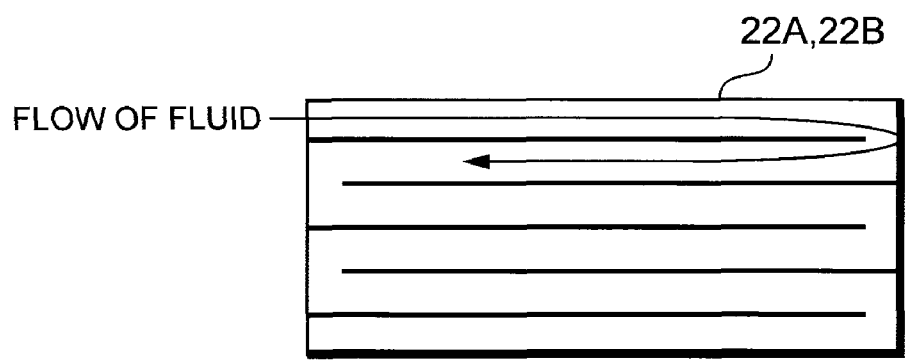
FIG. 5A is a schematic plan view illustrating a flow channel geometry of a separator according to a first modification of the embodiment.
Figure 5B:
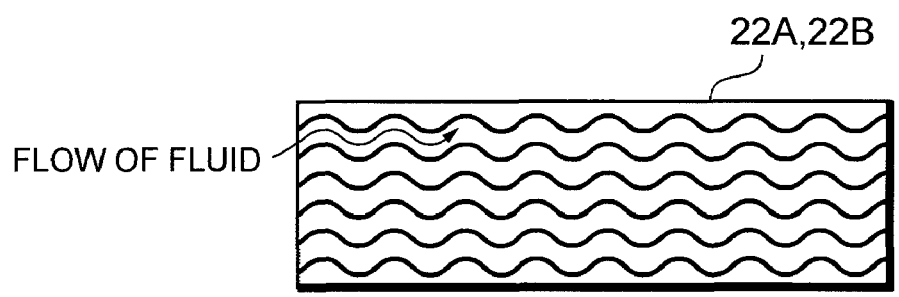
FIG. 5B is a schematic plan view illustrating a flow channel geometry of a separator according to a second modification of the embodiment.
Figure 5C:
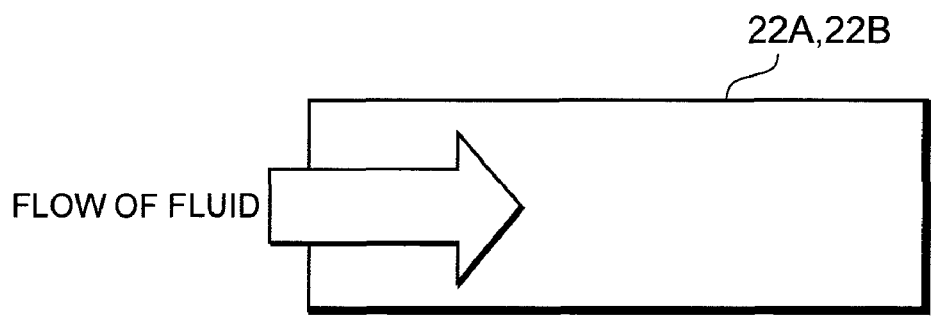
FIG. 5C is a schematic plan view illustrating a flow channel geometry of a separator according to a third modification of the embodiment.

FIGS. 5A to 5C are schematic plan views illustrating other flow channel geometries of a separator to which the present embodiment is applicable. In place of the mode of the straight gash flow channel (repetitive concavities and convexities extending in a single direction) illustrated in FIG. 4, the flow channel geometries of the flow channels 25A, 25B, 26A, and 26B can take a serpentine flow channel shape having folded portions midway as illustrated in FIG. 5A. In addition, as illustrated in FIG. 5B, the flow channels 25A, 25B, 26A, and 26B can take a wavy form or, as illustrated in FIG. 5C, a flat plate-like form without concavities and convexities. Furthermore, as for the flow pattern of the reactant gas, a counter-flow type in which hydrogen gas and air flow in opposite directions may be adopted in place of the coflow type (in which hydrogen gas and air flow in the same direction) as can be understood from FIGS. 1 and 4. Moreover, the separators 22A, 22B may be oriented either vertically or horizontally. In other words, estimation of a water content of the fuel cell 1 to be described later is not limited to a hardware configuration of the fuel cell 1.

B. Overview of Fuel Cell System

Figure 6:
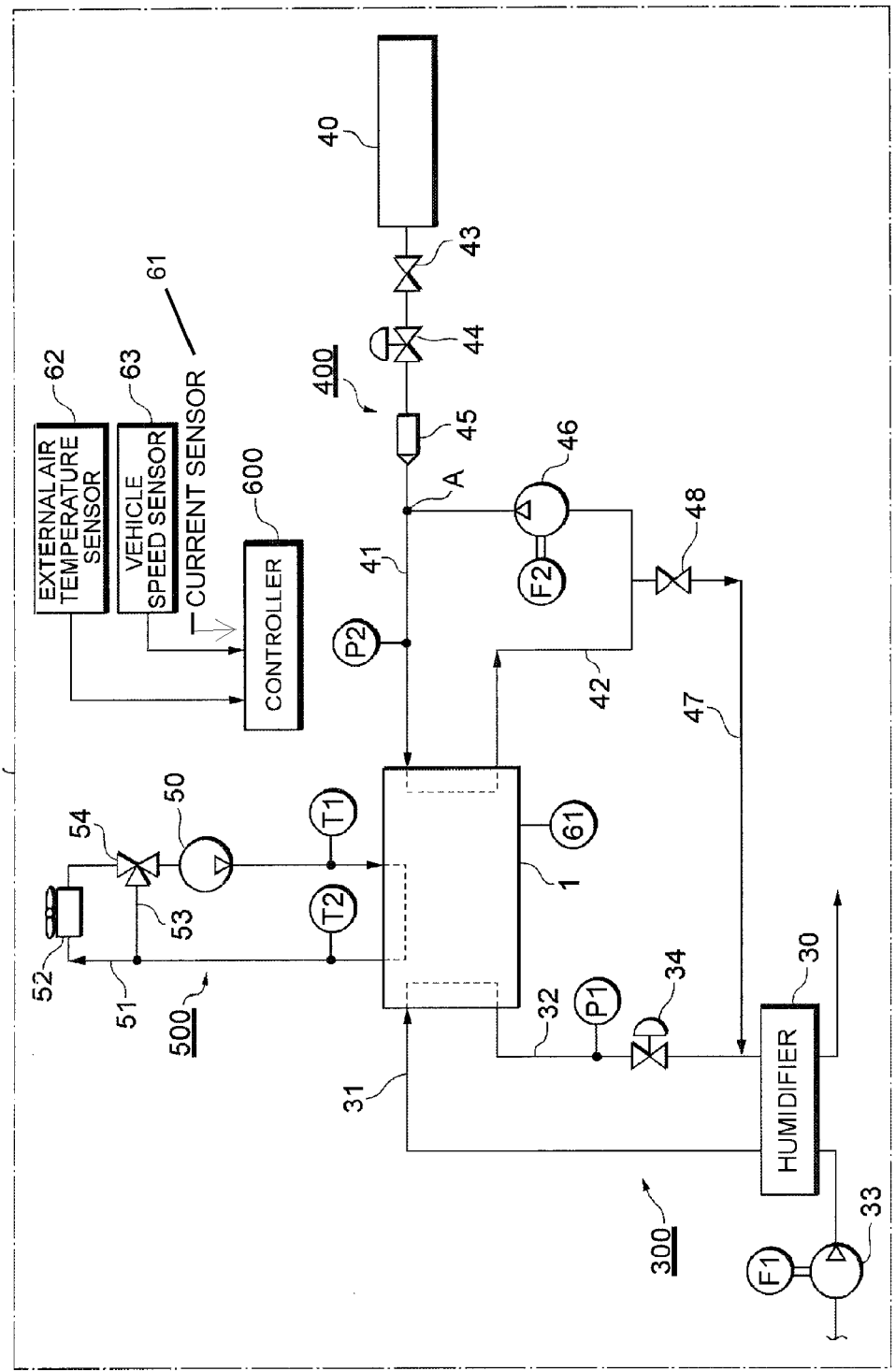
FIG. 6 is a configuration diagram of a fuel cell system according to the embodiment.

As illustrated in FIG. 6, a fuel cell system 100 includes an air piping system 300, a hydrogen piping system 400, a coolant piping system 500, and a controller 600. In addition to being mountable on various mobile objects such as a vehicle, a ship, an airplane, and a robot, the fuel cell system 100 is applicable to a stationary power source. Here, an example of the fuel cell system 100 mounted on a vehicle will be described.

The air piping system 300 is responsible for supplying air to and discharging air from the fuel cell 1, and includes a humidifier 30, a supply flow channel 31, an exhaust flow channel 32, and a compressor 33. Atmospheric air (air in a low moisture condition) is taken in by the compressor 33 and force-fed to the humidifier 30. Water exchange between atmospheric air and an oxidation off-gas in a high moisture condition is performed at the humidifier 30. As a result, adequately humidified air is supplied from the supply flow channel 31 to the fuel cell 1. A back pressure valve 34 for regulating an air back pressure of the fuel cell 1 is provided at the exhaust flow channel 32. In addition, a pressure sensor P1 for detecting an air back pressure is provided in the vicinity of the back pressure valve 34. A flow rate sensor F1 for detecting an air supply flow rate to the fuel cell 1 is provided at the compressor 33.

The hydrogen piping system 400 is responsible for supplying hydrogen gas to and discharging hydrogen gas from the fuel cell 1, and includes a hydrogen supply source 40, a supply flow channel 41, a circulatory flow channel 42, a shut valve 43, and the like. After hydrogen gas from the hydrogen supply source 40 is depressurized by a regulator 44, a flow rate and pressure of the hydrogen gas are regulated with high accuracy by an injector 45. Subsequently, hydrogen gas merges with a hydrogen off-gas force-fed by a hydrogen pump 46 on the circulatory flow channel 42 at a confluence A to be supplied to the fuel cell 1. A purge channel 47 with a purge valve 48 is branchingly connected to the circulatory flow channel 42. The hydrogen off-gas is discharged to the exhaust flow channel 32 by opening the purge valve 48. A pressure sensor P2 that detects a supply pressure of hydrogen gas to the fuel cell 1 is provided on a downstream-side of the confluence A. In addition, a flow rate sensor F2 is provided on the hydrogen pump 46. Moreover, in other embodiments, a fuel off-gas may be introduced to a hydrogen diluter or a gas-liquid separator may be provided at the circulatory flow channel 42.

The coolant piping system 500 is responsible for circulating a coolant (for example, cooling water) to the fuel cell 1, and includes a cooling pump 50, a coolant flow channel 51, a radiator 52, a bypass flow channel 53, and a switching valve 54. The cooling pump 50 force-feeds a coolant inside the coolant flow channel 51 into the fuel cell 1. The coolant flow channel 51 includes a temperature sensor T1 located on a coolant inlet-side of the fuel cell 1 and a temperature sensor T2 located on a coolant outlet-side of the fuel cell 1. The radiator 52 cools the coolant discharged from the fuel cell 1. The switching valve 54 is made of, for example, a rotary valve and switches coolant conduction between the radiator 52 and the bypass flow channel 53 as required.

The controller 600 is configured as a microcomputer internally provided with a CPU, a ROM, and a RAM. Detected information from the sensors (P1, P2, F1, F2, T1, and T2) that detect pressure, temperature, flow rate, and the like of fluids flowing through the respective piping systems 300, 400, and 500 are inputted to the controller 600. In addition, detected information of a current sensor 61 that detects a value of a current generated by the fuel cell 1, as well as detected information from an external air temperature sensor 62, a vehicle speed sensor 63, an accelerator opening sensor knot shown), and the like, are inputted to the controller 600. In response to such detected information and the like, the controller 600 controls the various devices (the compressor 33, the shut valve 43, the injector 45, the hydrogen pump 46, the purge valve 48, the cooling pump 50, the switching valve 54, and the like) in the system 100 so as to integrally control operations of the fuel cell system 100. Furthermore, the controller 600 reads various detected information, and estimates a water content of the fuel cell 1 using various maps stored in the ROM.

Figure 7:
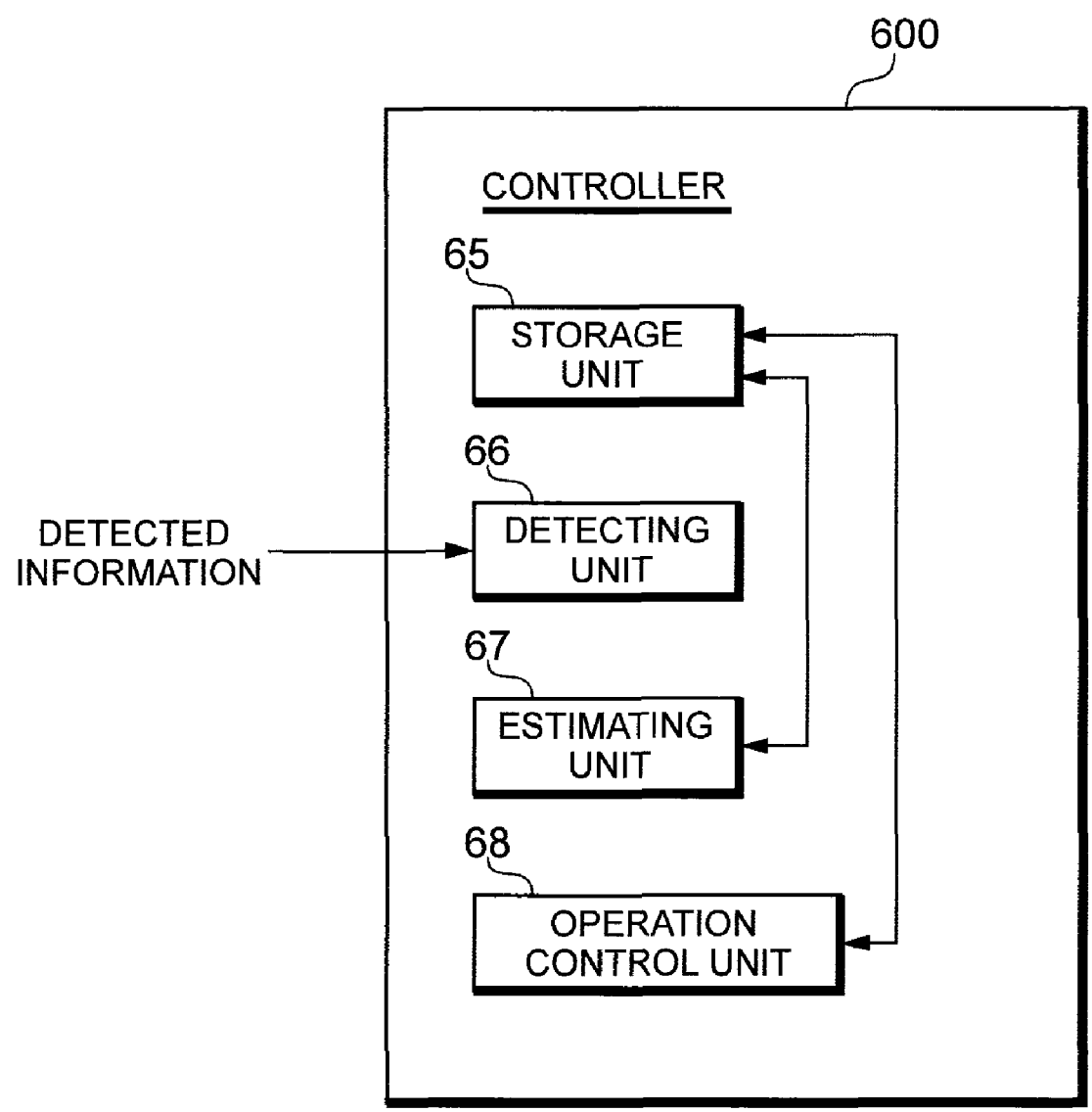
FIG. 7 is a functional block diagram of a controller according to the embodiment.

As illustrated in FIG. 7, the controller 600 includes a storage unit 65, a detecting unit 66, an estimating unit 67, and an operation control unit 68 as function blocks for estimating the water content of the fuel cell 1 and realizing control based on the estimation. The storage unit 65 stores various programs and various maps for estimating a water content of the fuel cell 1 and realizing control of the fuel cell 1. The maps are to be obtained in advance by experiment or simulation. The detecting unit 66 reads detected information of the various sensors (P1, P2, F1, F2, T1, T2, and 61 to 63) and the like. Based on an estimation result by the estimating unit 67, the operation control unit 68 transmits control instructions to the various devices and controls operation so as to place the fuel cell 1 in a desired operational state (for example, a water condition, a temperature condition, or the like). At this point, as required, the operation control unit 68 executes control that distinguishes between the anode side and the cathode side.

Based on the information acquired by the detecting unit 66, the estimating unit 67 references the various maps in the storage unit 65 to estimate a water content of the fuel cell 1. More specifically, the estimating unit 67 estimates a residual water content distribution and a moisture content distribution in a cell plane of the single cell 2 while taking into consideration water transfer that occurs between the electrodes 24A and 24B via the electrolyte membrane 23. In addition, the estimating unit 67 also estimates a residual water content distribution and a moisture content distribution of each single cell 2 in a lamination direction (hereinafter, referred to as cell lamination direction).

Here, "in a cell plane" refers to the inside of a single cell 2 in a planar direction (a direction parallel to a plane of paper of FIG. 4 and perpendicular to the cell lamination direction) of the single cell 2. "Residual water content" refers to an amount of liquid water existing in the reactant gas flow channel of the single cell 2. "Reactant gas flow channel" is a concept that collectively designates the hydrogen flow channel 25A and the air flow channel 25B. "Moisture content" refers to an amount of water contained in the electrolyte membrane 23 of the single cell 2.

C. Estimation Method of Water Content of Fuel Cell

A water content estimation method according to the present embodiment involves separately estimating a residual water content and a moisture content and, in doing so, estimating a residual water content distribution separately for the anode side and the cathode side. In addition, distributions of a residual water content and a moisture content in the cell lamination direction are estimated in addition to distributions in a cell plane. Hereinafter, firstly, an estimation method of water distribution (a residual water content distribution and a moisture content distribution) in a cell plane will be described. Subsequently, a description will be given on how temperature variation and flow distribution variation in the cell lamination direction are considered during estimation, followed by a description on a water distribution estimation method in the cell lamination direction.

1. Estimation Method of Water Distribution in a Cell Plane

Figure 8:
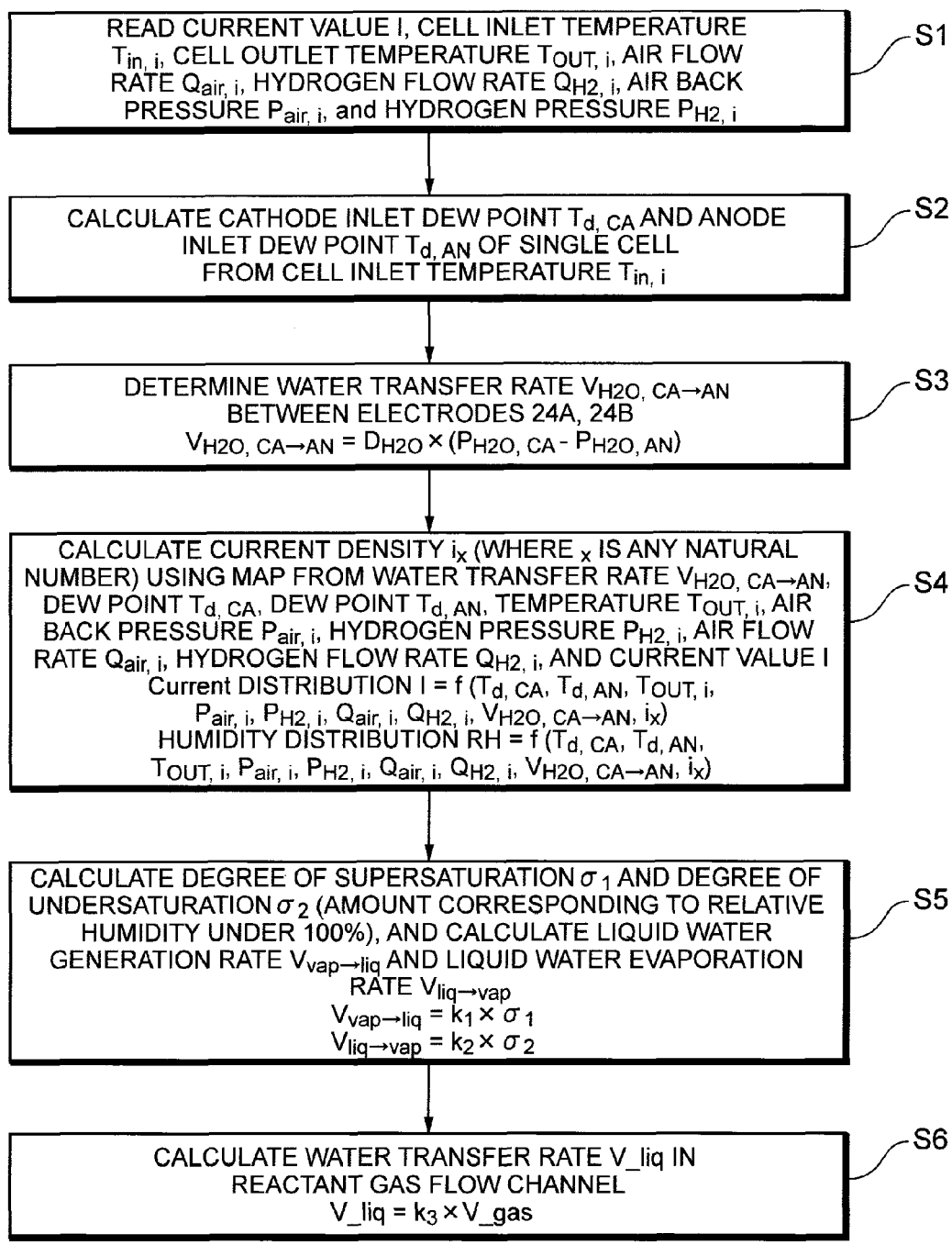
FIG. 8 is a flow chart illustrating a method of estimating water distribution in a cell plane according to the embodiment.

As illustrated in FIG. 8, firstly, a current value I, a cell inlet temperature $T_{in, I}$, a cell outlet temperature $T_{OUT, I}$, an air flow rate $Q_{air, I}$, a hydrogen flow rate $Q_{H2, I}$, an air back pressure $P_{air, I}$, and a hydrogen pressure $P_{H2, I}$ are read (step S1).

Figure 9:
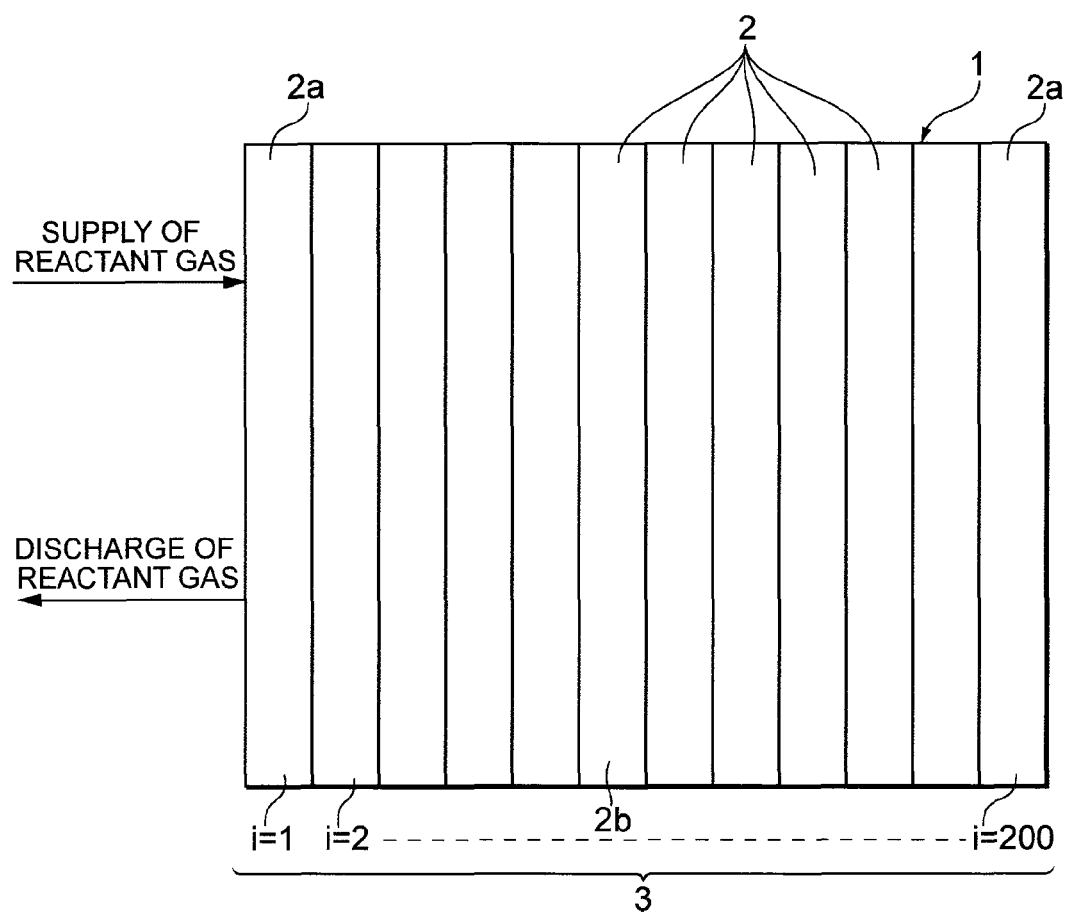
FIG. 9 is a diagram illustrating a relationship between supply and discharge of a reactant gas and a cell channel with respect to a cell laminate according to the embodiment.

Here, the current value I is a value detected by the current sensor 61. The subscript "I" in cell inlet temperature $T_{in, I}$ and the like designates the cell channel indicating a position of the single cell 2 in the cell laminate 3. More specifically, in a case where the cell laminate 3 illustrated in FIG. 9 is taken as a model, a cell channel "I" of an end cell 2a nearest to the supply port (corresponding to the supply ports 11a and 12a in FIG. 1) and the exhaust (corresponding to the exhausts 11b and 12b in FIG. 1) of the reactant gas takes a value of 1. In a case where 200 single cells 2 are laminated, the cell channel "I" of the other end cell 2a takes a value of 200.

The cell inlet temperature $T_{in, i}$ and the cell outlet temperature $T_{OUT, i}$ respectively indicate coolant temperatures at the coolant inlet 29a and the coolant outlet 29b of the single cell 2 (cell channel: i). The air flow rate $Q_{air, i}$ and the hydrogen flow rate $Q_{H2, i}$ respectively indicate supply flow rates of air and hydrogen gas which flow into the air inlet 28a and the hydrogen inlet 27a of, the single cell $2_i$. The air back pressure $P_{air, i}$ and the hydrogen pressure $P_{H2, i}$ respectively indicate pressures of air and hydrogen gas at the air outlet 28b and the hydrogen inlet 27a of the single cell $2_i$. The following applies in a case where the fuel cell has only one single cell 2 or in a case where temperature variation and flow distribution variation in the cell lamination direction are not considered.

$T_{in, i}$: detected value by the temperature sensor T1
$T_{OUT, i}$: detected value by the temperature sensor T2
$Q_{air, i}$: detected value by the flow rate sensor F1
$Q_{H2, i}$: hydrogen supply flow rate calculated from a detected value by the flow rate sensor F2
$P_{air, i}$: detected value by the pressure sensor P1
$P_{H2, i}$: detected value by the pressure sensor P2

On the other hand, in a case where the fuel cell 1 includes a plurality of single cells 2, heat discharge, pressure drop, and the like differ depending on positions in the cell lamination direction. Therefore, a heat discharge variation and flow distribution variations of the reactant gas and the coolant exist among the single cells 2. Accordingly, a cell inlet temperature $T_{in, i}$ and the like which take the above into consideration are desirably used. The method of consideration will be described later.

Values from sensors other than those described above or values calculated by other calculation methods may be used as the respective detected values used as the cell inlet temperature $T_{in, I}$ and the like. In other words, a temperature sensor, a flow rate sensor, and a pressure sensor may be provided at positions other than those illustrated in FIG. 6 and design changes to the numbers and positions thereof may be performed as appropriate. For example, a hydrogen flow rate sensor may be provided near the hydrogen supply port 11a of the fuel cell 1 and a detected value of the sensor be used as the hydrogen flow rate $Q_{H2, i}$. In addition, the cell inlet temperature $T_{in, I}$ and the cell outlet temperature $T_{OUT, I}$ can also be estimated by mounting temperature sensors to the end cell 2a or the end-plates 7a, 7b. As shown, by measuring a temperature of the fuel cell stack itself as opposed to a temperature of the coolant, water estimation can be performed with higher accuracy.

In step S2 illustrated in FIG. 8, a cathode inlet dew point $T_{d, CA}$ and an anode inlet dew point $T_{d, AN}$ of each single cell 2, are calculated from the cell inlet temperature $T_{in, i}$. In the present embodiment, since the humidifier 30 is used in the fuel cell system 1, the cell inlet temperature $T_{in, I}$ can be used as the cathode inlet dew point $T_{d, CA}$ and the anode inlet dew point $T_{d, AN}$, respectively. In other words, in a case where the air inlet 28a and the hydrogen inlet 27a are close to the coolant inlet 29a, the following expression becomes true and a lamination variation of dew points can be taken into consideration.

$$T_{d,CA} = T_{d,AN} = T_{in,i}$$

Moreover, in step S2, the cathode inlet dew point $T_{d, CA}$ and the anode inlet dew point $T_{d, AN}$ of each single cell 2, can be calculated from the cell outlet temperature $T_{out, i}$. Furthermore, in another embodiment, a dew-point meter may be used. For example, in a case where a humidifier is not used in the fuel cell system 1 or in a case where the cell inlet temperature is not used, dew-point meters may respectively be installed at stack inlets (the anode-side supply port 11a and the cathode-side supply port 12a) of the fuel cell 1 and the detected values of the dew-point meters be set as the cathode inlet dew point $T_{d,\,CA}$ and the anode inlet dew point $T_{d,\,AN}$. Such a configuration enables estimation with higher accuracy.

In addition, in an air non-humidification system in which the humidifier 30 is not mounted on the air piping system 300, the cathode inlet dew point $T_{d,\,CA}$ may be calculated as being 0° C. Alternatively, the cathode inlet dew point $T_{d,\,CA}$ may be calculated by a function of external air temperature and external humidity using an external air temperature sensor and an external humidity sensor. In other words, the present estimation method can also be applied to a non-humidification system.

In step S3 illustrated in FIG. 8, a water transfer rate $V_{H2O,\,CA\to AN}$ between the electrodes 24A, 24B is determined. The water transfer rate $V_{H2O,\,CA\to AN}$ is calculated as follows.

$$V_{H2O,CA\to AN}=D_{H2O}\times(P_{H2O,CA}-P_{H2O,AN})$$

In the above expression, $P_{H2O,\,CA}$ is a water vapor partial pressure on the side of the electrode 24B of the single cell $2_i$ and is calculated from the cathode inlet dew point $T_{d,\,CA}$. In addition, $P_{H2O,\,AN}$ is a water vapor partial pressure on the side of the electrode 24A of the single cell $2_i$ and is calculated from the anode inlet dew point $T_{d,\,AN}$. $D_{H2O}$ denotes water diffusivity in the electrolyte membrane 23. While a constant value can be used as $D_{H2O}$, since variances occur due to humidity, such variances are desirably taken into consideration.

Figure 10:
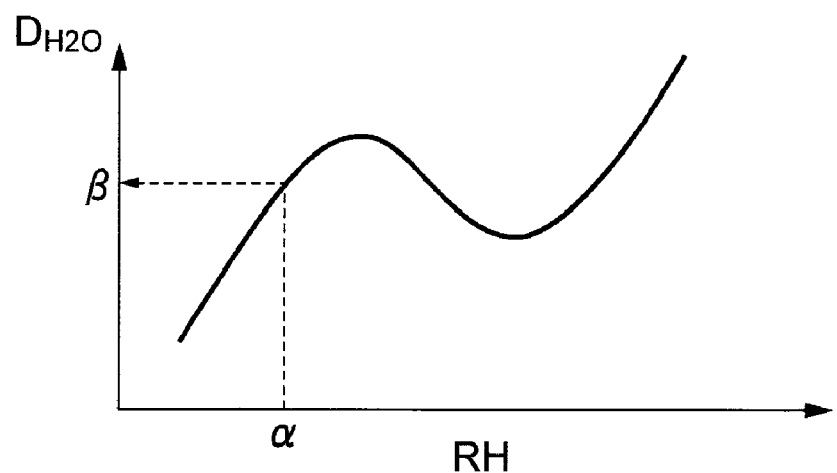
FIG. 10 is a characteristic map representing a relationship between relative humidity of an electrolyte membrane and $D_{H2O}$ according to the embodiment.

For example, a characteristic map representing a relationship between a relative humidity of the electrolyte membrane 23 and $D_{H2O}$ such as that illustrated in FIG. 10 may be created in advance, and using the characteristic map, a value of $D_{H2O}$ corresponding to the relative humidity of the electrolyte membrane 23 may be used. More specifically, a value ($\beta$) of $D_{H2O}$ to be used in an upcoming estimation can be determined from the map using a relative humidity a of the electrolyte membrane 23 estimated upon shutdown of a previous operation of the fuel cell 1, a relative humidity a of the electrolyte membrane 23 estimated during a downtime (suspension) of the fuel cell 1, or a relative humidity a of the electrolyte membrane 23 estimated at the fuel cell 1 immediately before the upcoming estimation.

Figure 11:
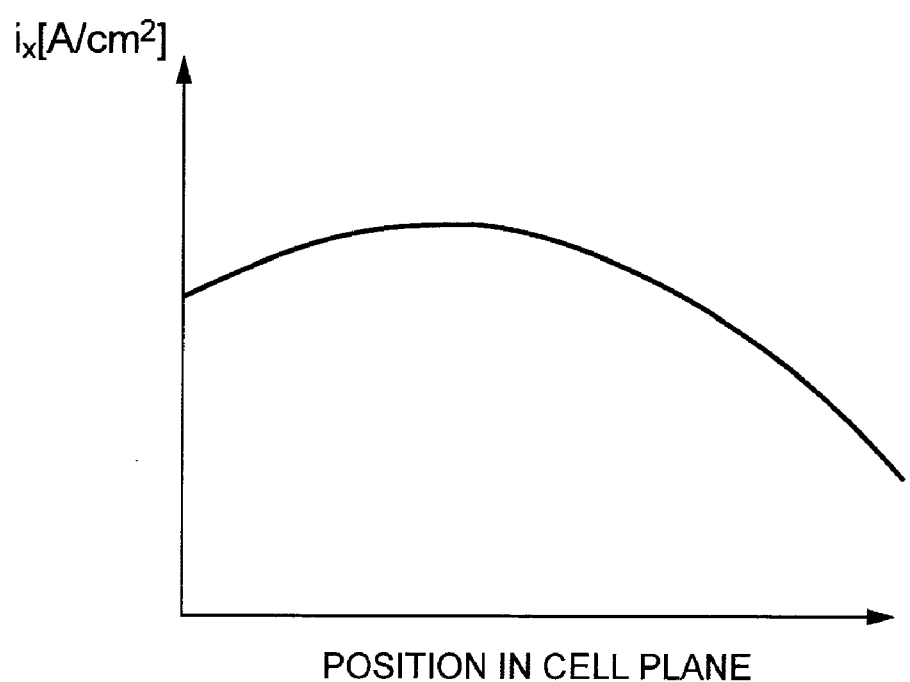
FIG. 11 is a diagram illustrating current density with respect to positions in a cell plane according to the embodiment.

In step S4 illustrated in FIG. 8, a current density $i_x$ (where x is any natural number) is calculated using a map from the water transfer rate $V_{H2O,\,CA\to AN}$, the dew point $T_{d,\,CA}$, the dew point $T_{d,\,AN}$, the temperature $T_{OUT,\,i}$, the air back pressure $P_{air,\,i}$, the hydrogen pressure $P_{H2,\,i}$, the air flow rate $Q_{air,\,i}$, the hydrogen flow rate $Q_{H2,\,i}$, and the current value I. The current density $i_x$ is a current density over an arbitrary area in the cell plane. For example, if respective areas for x=4 are to be denoted as $s_1$ to $s_4$, then $I=i_1\times s_1+i_2\times s_2+i_3\times s_3+i_4\times s_4$. An example of a calculation result of a distribution of the current density $i_x$ is illustrated in FIG. 11.

In addition, a current distribution and a relative humidity distribution in a cell plane are calculated in step S4. Functions I and RH which represent the distributions may be expressed as follows. Moreover, sensitivities of the functions I and RH with respect to each parameter ($T_{d,\,CA}$, $T_{d,\,AN}$, $T_{OUT,\,i}$, $P_{air,\,i}$, $P_{H2,\,i}$, $Q_{air,\,i}$, $Q_{H2,\,i}$, $V_{H2O,\,CA\to AN}$, $i_x$) are to be mapped in advance. In addition, an overvoltage distribution in the cell plane may also be calculated based on the parameters.

$$I=f(T_{d,CA},T_{d,AN},T_{OUT,i},P_{air,i},P_{H2,i},Q_{air,i},Q_{H2,i},\\V_{H2O,CA\to AN},i_x)$$

$$RH=f(T_{d,CA},T_{d,AN},T_{OUT,i},P_{air,i},P_{H2,i},Q_{air,i},Q_{H2,i},\\V_{H2O,CA\to AN},i_x)$$

Figure 12:
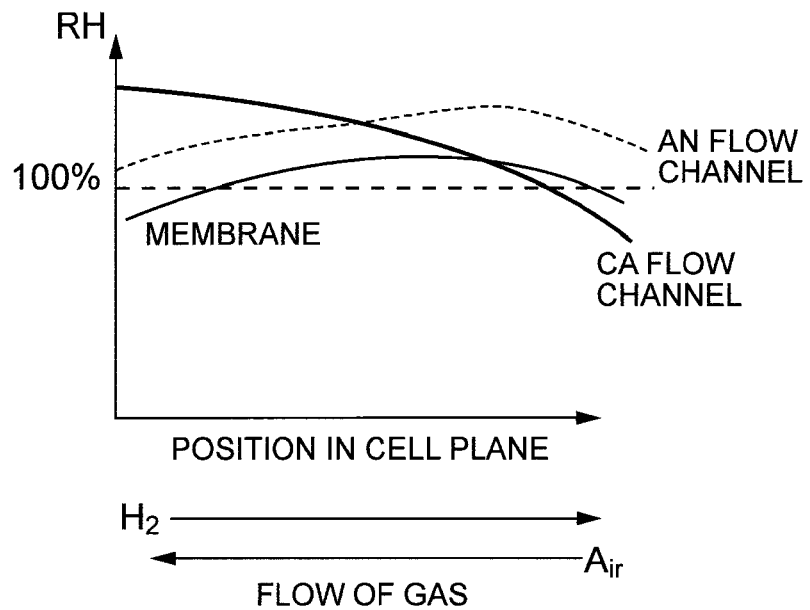
FIG. 12 is a diagram illustrating relative humidity distributions of a reactant gas flow channel and the electrolyte membrane in a cell plane according to the embodiment.

FIG. 12 is a diagram illustrating an example of relative humidity distributions (relative humidity distributions of the reactant gas flow channel and the electrolyte membrane) in a cell plane calculated in step S4. In the present embodiment, a counterflow flow channel mode is taken as an example so that flows of hydrogen gas and air are shown in relation to a position in a cell plane in FIG. 12. As illustrated in FIG. 12, while relative humidity has exceeded 100% and is in a supersaturated state from the hydrogen inlet 27a to the hydrogen outlet 27b in an AN flow channel (the hydrogen flow channel 25A), relatively humidity is below 100% on the side of the air outlet 28b in a CA flow channel (the air flow channel 25B). In addition, a central part (a central part of the single cell 2) of the electrolyte membrane 23 is in a supersaturated state.

In step S5 illustrated in FIG. 8, a degree of supersaturation $\sigma_1$ (an amount corresponding to relative humidity over 100%) and a degree of undersaturation $\sigma_2$ (an amount corresponding to relative humidity under 100%) are respectively calculated for the anode side and the cathode side from the relative humidity distribution result illustrated in FIG. 12, and a liquid water generation rate $V_{vap\to liq}$ and a liquid water evaporation rate $V_{liq\to vap}$ are calculated from the expressions given below. $V_{vap\to liq}$ and $V_{liq\to vap}$ in the hydrogen flow channel 25A and the air flow channel 25B are respectively calculated in consideration of the fact that phases (gas phase, liquid phase) of water vary in the reactant gas flow channel.

$$V_{vap\to liq}=k_1\times\sigma_1$$

$$V_{liq\to vap}=k_2\times\sigma_2$$

In the above expressions, coefficients $k_1$, $k_2$ represent factors due to temperature and water repellency and attributable to properties of the reactant gas flow channel. The coefficients $k_1$, $k_2$ are to be mapped in advance from an experiment.

In step S6 illustrated in FIG. 8, a water transfer rate V_liq in the reactant gas flow channel is respectively calculated for the anode side and the cathode side from the following expression. Respective water transfer rates V_liq in the hydrogen flow channel 25A and the air flow channel 25B are calculated in consideration of the fact that liquid water is blown away and discharged from inside the cell plane by the flow of reactant gas in the reactant gas flow channel.

$$V\_liq=k_3\times V\_gas$$

In this case, the water transfer rate V_liq refers to a transfer rate of liquid water blown away by the reactant gas. In addition, V_gas denotes a water vapor flow rate in the reactant gas flow channel. A value calculated from a map related to a state quantity such as a supply flow rate of reactant gas and water vapor partial pressure is to be used. The coefficient $k_3$ represents a factor due to temperature or water repellency and attributable to properties of the reactant gas flow channel. The coefficient $k_3$ is to be mapped in advance from an experiment.

Figure 13:
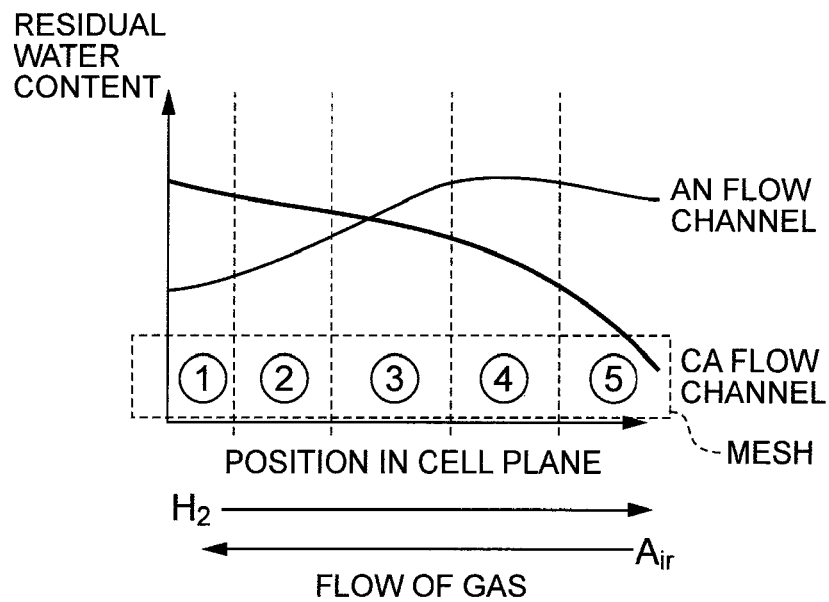
FIG. 13 is a diagram illustrating a residual water content distribution in a cell plane according to the embodiment.

FIG. 13 is a diagram illustrating an example of a residual water content distribution in a cell plane calculated in steps S4 to S6. The residual water content distribution is determined by taking into consideration the variation of liquid water in the reactant gas flow channel (in other words, $V_{vap\to liq}$, $V_{liq\to vap}$, and V_liq calculated in steps S5 and S6 described above) in addition to the relative humidity distribution (FIG. 12) in the reactant gas flow channel calculated in step S4. As can be understood from FIG. 13, in the hydrogen flow channel 25A, the residual water content is higher on the side of the hydrogen outlet 27b than the side of the hydrogen inlet 27a, and in the air flow channel 25B, the residual water content gradually drops toward the side of the air outlet 28b. Moreover, although not diagrammatically illustrated, a moisture content distribution in a cell plane can be determined from the relative humidity distribution (FIG. 12) of the electrolyte membrane 23 calculated in step S4 and is to approximate the relative humidity distribution.

From the procedure described above, variations (water balance) in a residual water content and a moisture content of a single cell $2_i$ in a given calculation time can be calculated and a residual water content distribution of the hydrogen flow channel 25A, a residual water content distribution of the air flow channel 25B, and a moisture content distribution of the electrolyte membrane 23 can be determined. Water balance in a cell plane can be calculated based on a coarseness of a mesh with sensitivity (for example, the five meshes illustrated in FIG. 13). Accordingly, how much residual water content and moisture content exist in which portion can be estimated with high accuracy.

2. Consideration of Temperature Variation and Flow Distribution Variation in Cell Lamination Direction During Estimation $T_{IN, I}$, $T_{OUT, I}$, $P_{air, I}$, $P_{H2, I}$, $Q_{air, I}$, and $Q_{H2, I}$ of each single cell $2_i$ are to be determined as follows.

(1) Calculation of Cell Inlet Temperature $T_{IN, i}$

Figure 14:
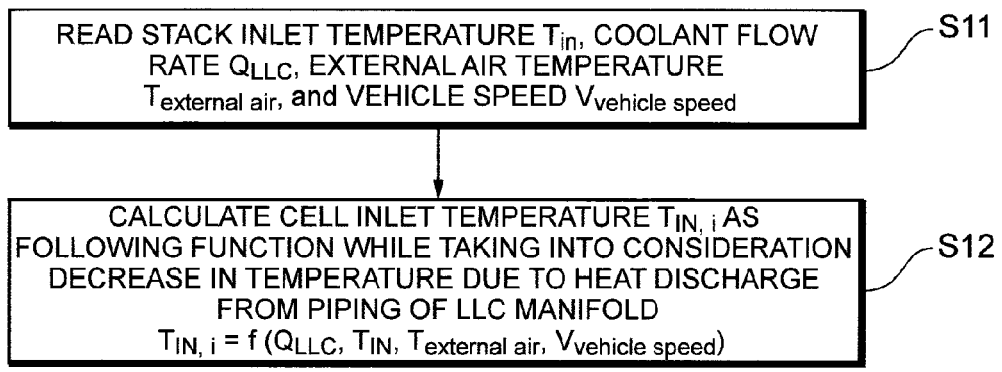
FIG. 14 is a flow chart illustrating a method of calculating a cell inlet temperature according to the embodiment.

As illustrated in FIG. 14, first, a stack inlet temperature $T_{in}$, a coolant flow rate $Q_{LLC}$, an external air temperature $T_{external\ air}$, and a vehicle speed $V_{vehicle\ speed}$ are read (step S11). In this case, $T_{in}$ is a detected value by the temperature sensor T1. $Q_{LLC}$ is a flow rate of the coolant to be supplied to the fuel cell 1 and can be estimated from the number of revolutions of the cooling pump 50 and other detected values. Alternatively, a flow rate sensor may be provided at the coolant flow channel 51 and a detected value by the flow rate sensor may be used. $T_{external\ air}$ is a detected value by the external air temperature sensor 62 and $V_{vehicle\ speed}$ is a detected value by the vehicle speed sensor 63.

Figure 15A:
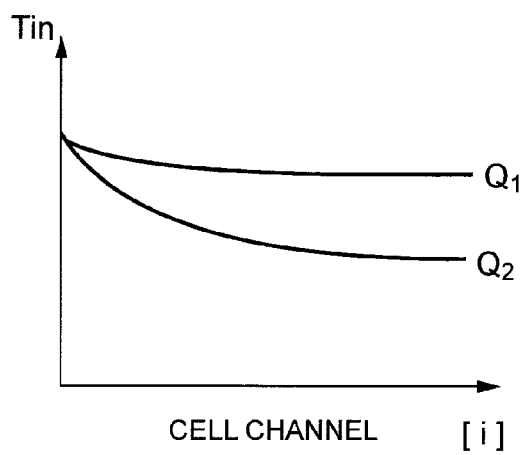
FIG. 15A is a diagram illustrating a relationship between single cell position and coolant flow rate with respect to the influence of heat discharge on a stack inlet temperature according to the embodiment.
Figure 15B:
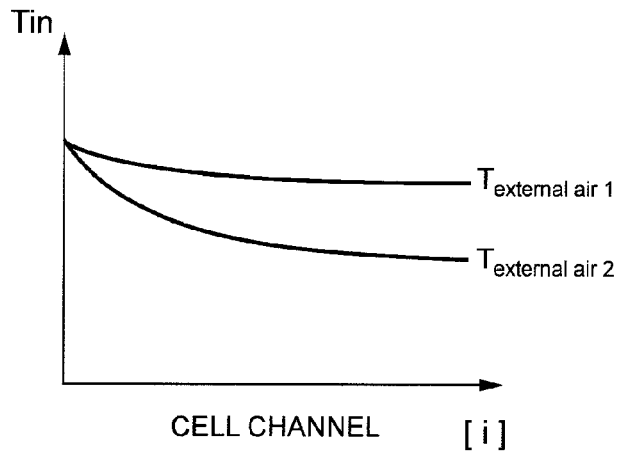
FIG. 15B is a diagram illustrating a relationship between single cell position and external air temperature with respect to the influence of heat discharge on the stack inlet temperature according to the embodiment.

Generally, in the cell laminate 3, the further away from the supply port 14 of the reactant gas or, in other words, the greater the cell channel "I," the greater the heat discharge. In addition, the influence of heat discharge varies depending on the coolant flow rate, the external air temperature, and the vehicle speed. For example, as illustrated in FIG. 15A, the greater the coolant flow rate $Q_{LLC}$ ($Q_1 > Q_2$), the less the stack inlet temperature $T_{IN}$ is influenced by heat discharge. In other words, the cell inlet temperature $T_{IN, I}$ can be prevented from dropping below the stack inlet temperature $T_{IN}$. In addition, as illustrated in FIG. 15B, the higher the $T_{external\ air}$ ($T_{external\ air\ 1} > T_{external\ air\ 1}$), the less the stack inlet temperature $T_{IN}$ is influenced by heat discharge.

Therefore, in consideration of such declines in coolant temperature due to heat discharge, the cell inlet temperature $T_{IN, I}$ is to be calculated as a function expressed as follows (step S12).

$$T_{IN, I} = f(Q_{LLC}, T_{IN}, T_{external\ air}, V_{vehicle\ speed})$$

Accordingly, a cell inlet temperature $T_{IN, I}$ corresponding to the cell channel I can be calculated from the respective values of $Q_{LLC}$, $T_{IN}$, $T_{external\ air}$, and vehicle speed described above.

Figure 16:
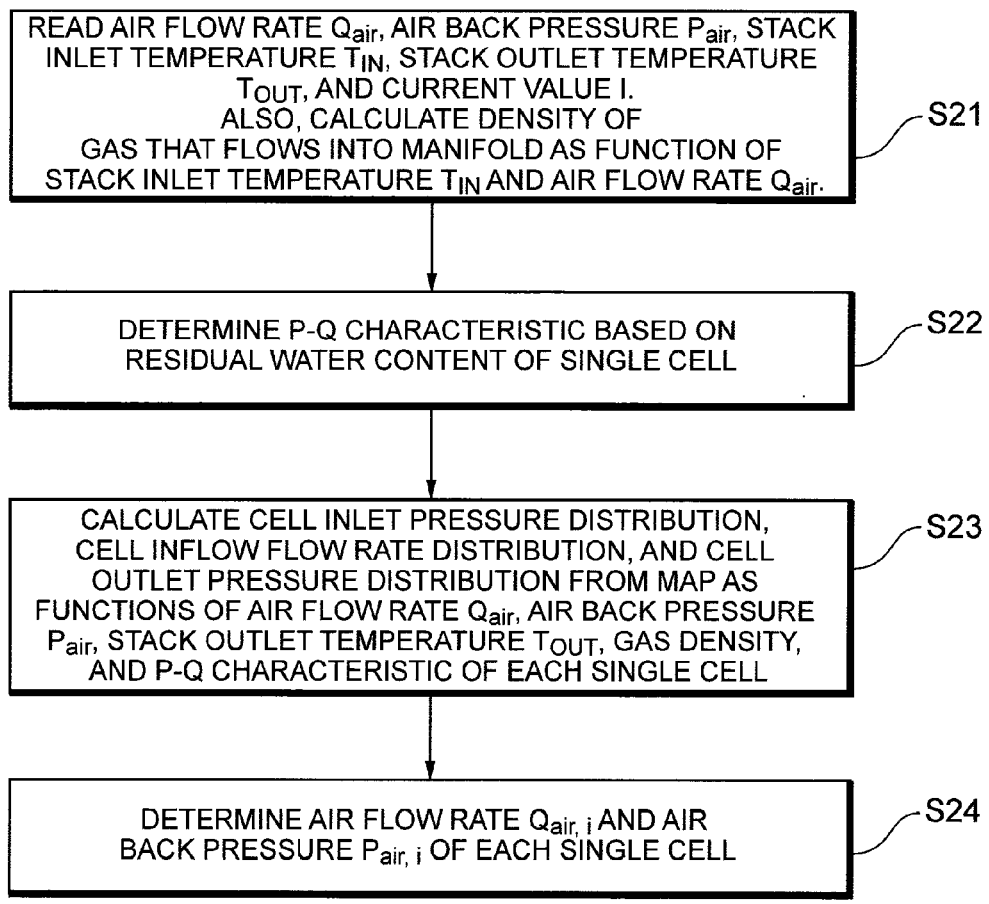
FIG. 16 is a flow chart illustrating a method of calculating an air flow rate and an air back pressure for each single cell according to the embodiment.

(2) Calculation of Air Flow Rate $Q_{air, I}$ and Air Back Pressure $P_{air, i}$ As illustrated in FIG. 16, first, an air flow rate $Q_{air}$, an air back pressure $P_{air}$, a stack inlet temperature $T_{IN}$, a stack outlet temperature $T_{OUT}$, and a current value I are read (step S21). In this case, the air flow rate $Q_{air}$, the air back pressure $P_{air}$, and the stack outlet temperature $T_{out}$ are respective detected values of the flow rate sensor F1, the pressure sensor P1, and the temperature sensor T2. In addition, in step S21, a gas density of air that flows into the manifold 15a is calculated as a function of the stack inlet temperature $T_{IN}$ and the air flow rate $Q_{air}$.

Figure 17:
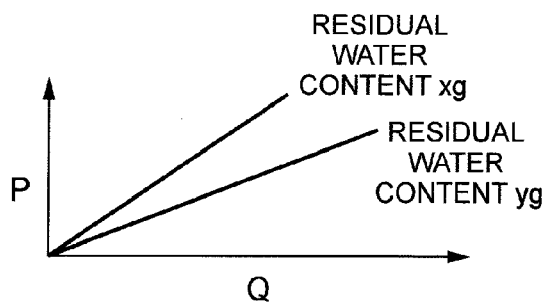
FIG. 17 is a map illustrating a P-Q characteristic of a single cell corresponding to a residual water content according to the embodiment.

In the following step S22, a P-Q characteristic (a characteristic representing a relationship between air back pressure and air flow rate) of a single cell $2_i$ is determined based on the residual water content of the single cell $2_i$. For example, a map representing a P-Q characteristic (pressure-flow rate characteristic) corresponding to a plurality of residual water contents (x>y) such as that illustrated in FIG. 17 is to be acquired in advance, and a P-Q characteristic corresponding to an immediately previous residual water content (a total amount of the cathode-side residual water content of the single cell $2_i$) calculated by the flow illustrated in FIG. 8 is determined.

Figure 18A:
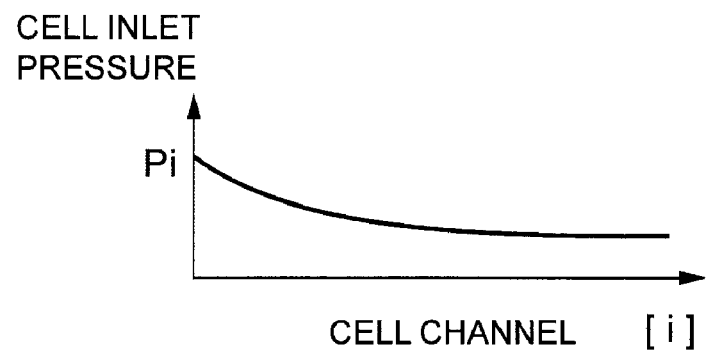
FIG. 18A is a diagram illustrating a cell inlet pressure distribution according to the embodiment.
Figure 18B:
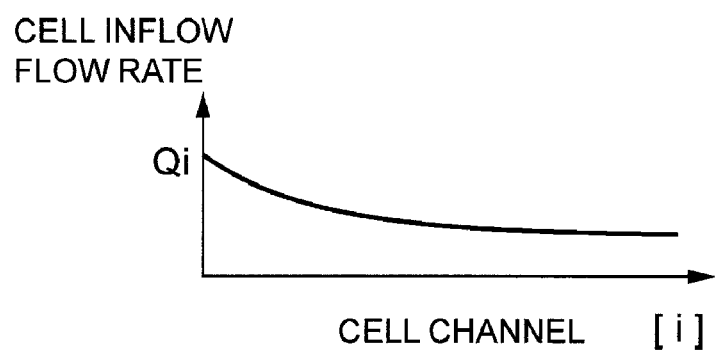
FIG. 18B is a diagram illustrating a cell inflow flow rate distribution according to the embodiment.
Figure 18C:
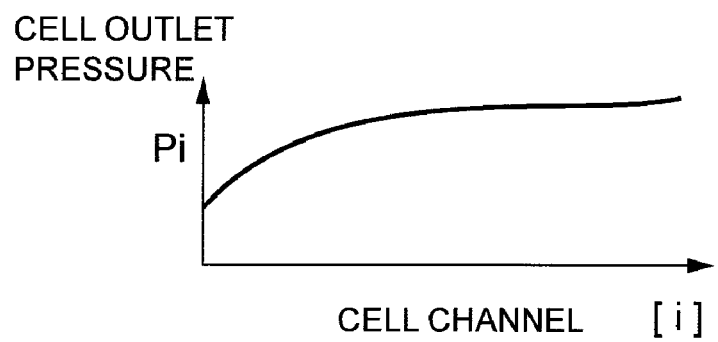
FIG. 18C is a diagram illustrating a cell outlet pressure distribution according to the embodiment.

Next, a cell inlet pressure distribution, a cell inflow flow rate distribution, and a cell outlet pressure distribution are calculated from a map as functions of the air flow rate $Q_{air}$, the air back pressure $P_{air}$, the stack outlet temperature $T_{OUT}$, the gas density calculated above, and the P-Q characteristic of each single cell $2_i$ (step S23). An example of the distributions are as illustrated in FIGS. 18A to 18C. In this case, since the cell inflow flow rate illustrated in FIG. 18B and the cell outlet pressure illustrated in FIG. 18C correspond to an air flow rate $Q_{air, I}$ and an air back pressure $P_{air, I}$ of the cell channel I, respective values thereof can be determined (step S24).

Moreover, although a detailed description will not be given, a hydrogen flow rate $Q_{H2, I}$ and a hydrogen pressure $P_{H2, I}$ of the single cell $2_i$ can also be calculated by the same method as used for the calculations of the air flow rate $Q_{air, I}$ and the air back pressure $P_{air, i}$. In this case, since the cell inlet pressure illustrated in FIG. 18A corresponds to the hydrogen pressure $P_{H2, I}$ and the cell inflow flow rate illustrated in FIG. 18B corresponds to the hydrogen flow rate $Q_{H2, I}$, respective values thereof can be determined.

(3) Calculation of Cell Outlet Temperature $T_{OUT, i}$

Figure 19:
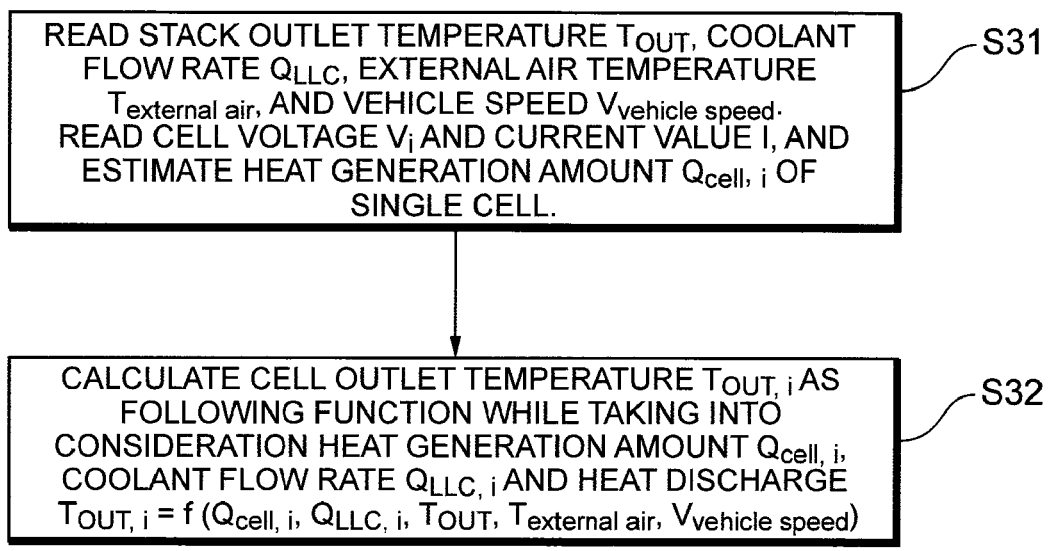
FIG. 19 is a flow chart illustrating a method of calculating a cell outlet temperature according to the embodiment.

As illustrated in FIG. 19, first, a stack outlet temperature $T_{OUT}$ is read as a detected value of the temperature sensor T2 (step S31). In addition, a coolant flow rate $Q_{LLC}$, an external air temperature $T_{external\ air}$, and a vehicle speed $V_{vehicle\ speed}$ are read in the same manner as in the case of the stack inlet temperature $T_{IN}$ described above. Furthermore, a cell voltage $V_i$ and a current value I are read, and a heat generation amount $Q_{cell, I}$ each single cell $2_i$ is estimated from an I-V characteristic of each single cell $2_i$.

In this case, a voltage value of each single cell $2_i$ detected by a cell monitor, not illustrated, can be used as the cell voltage $V_i$. However, instead of using a sensor such as a cell monitor, the cell voltage $V_i$ can also be estimated by having each single cell 2, retain an I-V map (dependent on an electric-generating capacity, an air flow rate, a hydrogen flow rate, an air back pressure, and a hydrogen pressure). Moreover, the heat generation amount $Q_{cell, I}$ is attributable to heat generation by $T\Delta S$ and heat loss due to overvoltage.

Figure 20:
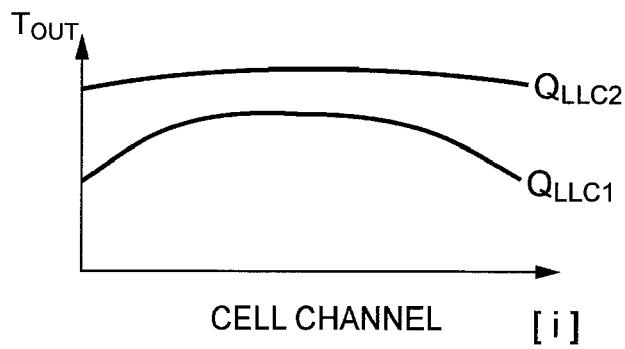
FIG. 20 is a diagram illustrating a relationship between single cell position and coolant flow rate with respect to the influence of heat discharge on a stack outlet temperature according to the embodiment.

In the same manner as the stack inlet temperature $T_{IN}$ described above, the stack outlet temperature $T_{OUT}$ is also influenced by heat discharge depending on the position of the single cell $2_i$ in the cell laminate 3. For example, as illustrated in FIG. 20, the greater the coolant flow rate $Q_{LLC}$ ($Q_{LLC1} < Q_{LLC2}$), the less the stack outlet temperature $T_{OUT}$ is influenced by heat discharge.

Therefore, the coolant flow rate $Q_{LLC, i}$ and heat discharge are taken into consideration in addition to the heat generation amount $Q_{cell, i}$, and the cell outlet temperature $T_{OUT, i}$ is to be calculated as a function expressed as follows (step S32).

$$T_{OUT, i} = f(Q_{cell, i}, Q_{LLC, i}, T_{OUT}, T_{external\ air}, V_{vehicle\ speed})$$

Accordingly, a cell outlet temperature $T_{OUT,i}$ corresponding to the cell channel i can be calculated from respective detected values or estimated values represented by the parameters.

Moreover, $Q_{LLC,i}$ is a coolant flow rate to be supplied to each single cell 2 and takes into consideration a flow distribution variation with respect to the coolant flow rate $Q_{LLC}$ described earlier in a case where a single fuel cell stack 1 is assumed. More specifically, by creating in advance a map representing a relationship between the coolant flow rate $Q_{LLC}$ and the cell channel i for each of several coolant flow rates $Q_{LLC}$, a $Q_{LLC,i}$ corresponding to the cell channel i can be calculated.

According to the procedures (1) to (3) described above, values that take into consideration a temperature distribution (a variation in heat discharge or the like) and pressure drop distribution (flow distribution variations of oxidation gas, fuel gas, coolant, or the like) can be used for state quantities of each single cell $2_i$ in the flows (steps S1, S2, and S4) illustrated in FIG. 8. Accordingly, compared to a case where the fuel cell 1 is singularly perceived as a stack, a residual water content distribution and a moisture content distribution can be estimated with high accuracy for all single cells 2 (in other words, in a cell lamination direction).

D. Estimation During System Standstill and Control Example Using Estimation Result Thereof.

First, general fluctuations in residual water content through a sequence of operation shutdown, standstill, and restart of the fuel cell system 100 will be described with reference to FIGS. 21 to 24. Next, an estimation of an anode-side residual water content during the standstill of the fuel cell system 100 will be described with reference to FIGS. 25 and 26. Finally, a control example using an estimation result during the standstill will be described with reference to FIGS. 27A and 27B.

FIG. 21 is a diagram illustrating an example of a variation in a residual water content of the single cell 2 over time when the control example according to the present embodiment is not executed.

As illustrated in FIG. 21, the cathode-side residual water content is higher than the anode-side residual water content up to a segment where the fuel cell system 100 is in operation (up to time $t_1$). This is because, as described above, water is generated on the cathode side accompanying power generation of the single cell 2. Once operation of the fuel cell system 100 is shutdown at time $t_1$, during a subsequent standstill segment (time $t_1$ to $t_2$), a difference in water vapor partial pressure (temperature difference) causes water to be transferred from the cathode side to the anode side and a reversal of the sizes of residual water contents may occur. In addition, the anode-side residual water content may be greater upon system restart (time $t_2$) than upon system shutdown (time $t_1$).

Figure 22A:
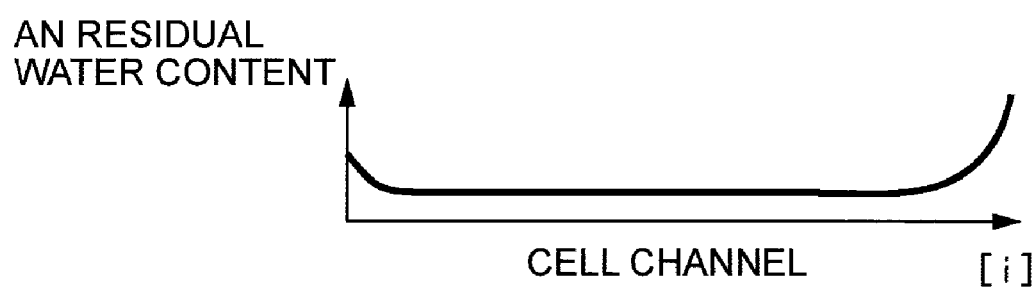
FIG. 22A is a diagram illustrating an example of a residual water content distribution in a hydrogen flow channel upon system restart when the cell laminate illustrated in FIG. 9 is used as a model.
Figure 22B:
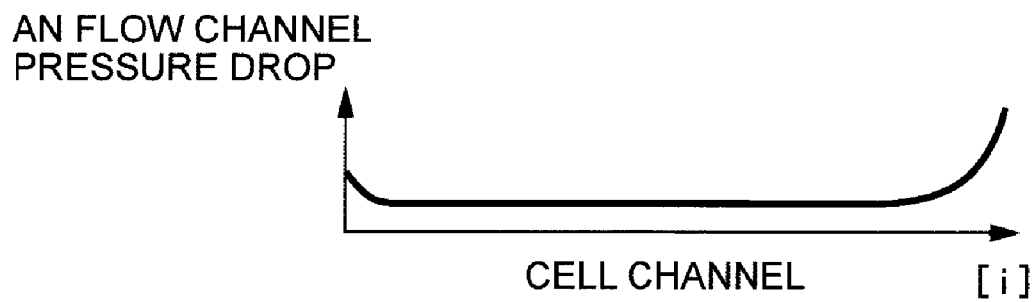
FIG. 22B is a diagram illustrating an example of a pressure drop distribution in the hydrogen flow channel upon system restart when the cell laminate illustrated in FIG. 9 is used as a model.

FIGS. 22A and 22B illustrate examples of a residual water content distribution and a pressure drop distribution of the hydrogen flow channel 25A upon system restart (time $t_2$) when the cell laminate 3 illustrated in FIG. 9 is used as a model.

As illustrated in FIG. 22A, residual water content is higher towards the end cell $2a$ and lower at a single cell 2 in a central part in the lamination direction (hereinafter referred to as a primary cell $2b$; refer to FIG. 9). In particular, an end cell $2a$ to the back in the cell lamination direction (a downstream side in the supply direction of reactant gas in the cell laminate 3) has a higher residual water content than an end cell $2a$ to the front in the cell lamination direction. The higher the residual water content, the more the flow of hydrogen gas is inhibited and the higher the pressure drop in the hydrogen flow channel 25A (refer to FIG. 22B).

Figure 23:
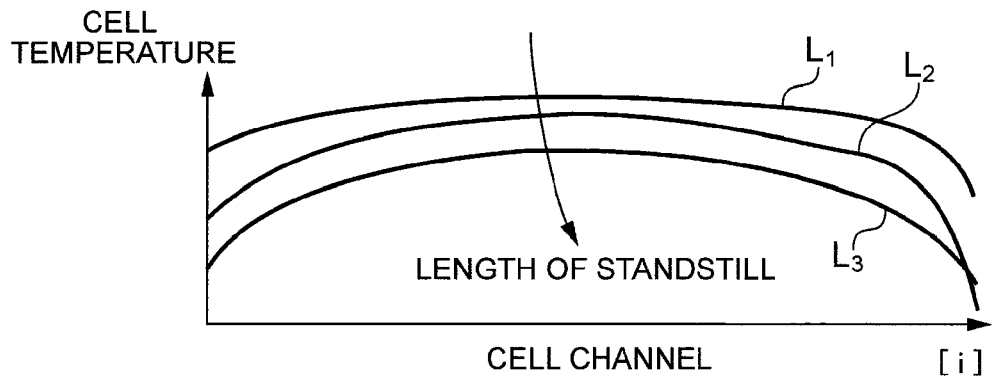
FIG. 23 illustrates an example of a variation in cell temperature during system standstill when the cell laminate illustrated in FIG. 9 is used as a model.

FIG. 23 illustrates an example of a variation in cell temperature during system standstill when the cell laminate 3 illustrated in FIG. 9 is used as a model.

As represented by the curves $L_1$ to $L_3$ in FIG. 23, the longer the standstill ($=t_2-t_1$) of the fuel cell system 100, the greater the drop in cell temperature. Cell temperature differs depending on the position of the single cell 2 in the cell laminate 3. The end cell $2a$ has the lowest cell temperature. This is because the closer to the end of the cell laminate 3, the greater the heat discharge. Cell temperature refers to, for example, the cell outlet temperature $T_{OUT,I}$ described earlier.

Figure 24:
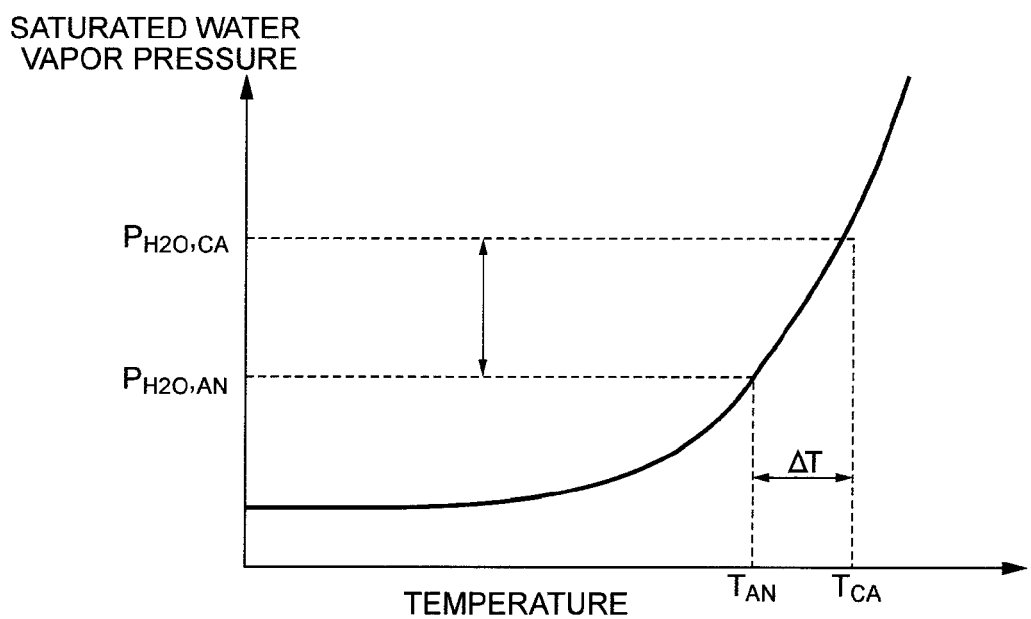
FIG. 24 illustrates an example of a relationship between a temperature of a single cell and saturated water vapor pressure during system standstill when the cell laminate illustrated in FIG. 9 is used as a model.

FIG. 24 illustrates an example of a relationship between the temperature of a single cell 2 and saturated water vapor pressure during system standstill.

As illustrated in FIG. 24, at an arbitrary single cell 2, a temperature $T_{AN}$ of the anode electrode 24A positioned outward in the cell lamination direction is likely to be lower than a temperature $T_{CA}$ of the cathode electrode 24B positioned more inward in the cell lamination direction than the anode electrode 24A. The temperature difference $\Delta T$ thereof is likely to be greater at the end cell $2a$ than at the primary cell $2b$. This is due to the difference in heat discharge described earlier. Due to the temperature difference $\Delta T$, a difference in water vapor partial pressure is generated between the electrodes 24A and 24B and water is transferred from the side of the cathode electrode 24B to the side of the anode electrode 24A through the electrolyte membrane 23. The greater the temperature difference $\Delta T$, the greater the difference in water vapor partial pressure and therefore the greater the water transfer amount.

As a result of the water transfer during system standstill, there is a possibility that the supply amount of hydrogen gas to the hydrogen flow channel 25A may be deficient upon system restart. In particular, there is a high possibility of a supply amount of hydrogen gas being deficient when a rapid output increase request is issued such as during a WOT (wide open throttle: a full opening of a throttle valve) in a vehicle-mounted state of the fuel cell system 100. A deficient supply amount may cause deterioration of the MEA 20. In order to suppress a deficient supply amount of hydrogen gas upon system restart, it is preferable to accurately determine water transfer during system standstill and maintain a residual water content in the hydrogen flow channel 25A at an adequate condition.

Thus, in the present embodiment, a residual water content distribution in the hydrogen flow channel 25A is also estimated during system standstill and, to this end, a temperature of the single cell 2 is acquired during system standstill. In this case, the cell outlet temperature $T_{OUT,i}$ described earlier is acquired as the temperature of the single cell 2. In other words, in the present embodiment, one stack outlet temperature $T_{OUT}$ is detected by the temperature sensor T2 using the method described in "(3) Calculation of cell outlet temperature $T_{OUT,i}$" above, and the estimating unit 67 calculates a cell outlet temperature $T_{OUT,i}$ of each single cell 2 from the detected value.

In the calculation of the cell outlet temperature $T_{OUT,i}$ during the system operation described above, the following function is used.

$$T_{OUT,i} = f(Q_{cell,i}, Q_{LLC,i}, T_{OUT}, T_{external\ air}, V_{vehicle\ speed})$$

However, the parameters of heat generation amount $Q_{cell}$, coolant flow rate $Q_{LLC,i}$, and vehicle speed $V_{vehicle\ speed}$ need not be used in the calculation of the cell outlet temperature $T_{OUT,i}$ during system standstill. This is because the values of the parameters become zero during system standstill.

Therefore, as the cell outlet temperature $T_{OUT,i}$ during system standstill, a value calculated using the following function which takes into consideration a variation in heat discharge in the cell laminate 3 is to be used.

$$T_{OUT,i} = f(T_{OUT}, T_{external\,air})$$

Here, while the calculation of the cell outlet temperature $T_{OUT,I}$ during system standstill is to be performed at least once, the calculation is desirably performed a plurality of times. The reason therefor will now be described with reference to FIG. 25.

Figure 25:
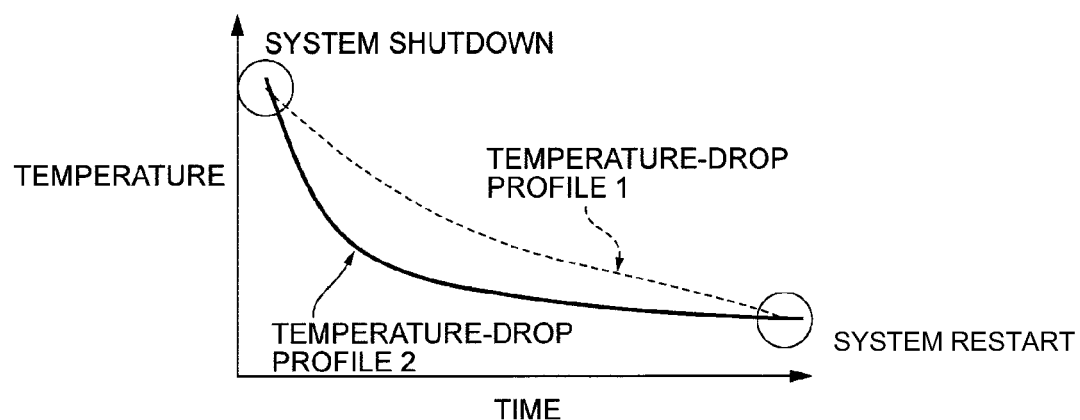
FIG. 25 is a diagram to be used for describing an estimation of an anode-side residual water content during system standstill and illustrates a mode of a temperature variation in a single cell during system standstill.

FIG. 25 illustrates a time variation in cell outlet temperature $T_{OUT,I}$ from system shutdown to system restart (in other words, during system standstill). A temperature-drop profile of the cell outlet temperature $T_{OUT,I}$ during system standstill differs according to conditions in which the fuel cell system 100 is placed. Therefore, a temperature-drop profile 1 depicted by a dotted line in FIG. 25 and a temperature-drop profile 2 depicted by a solid line in FIG. 25 differs in temperature distributions created on the cell laminate 3, and result in different water transfer amounts into the hydrogen flow channel 25A due to the temperature difference ΔT between the electrodes.

In this regard, assuming that an estimation is to be performed using only temperature information on cell outlet temperatures $T_{OUT,I}$ upon system shutdown and upon system restart, it is impossible to determine what kind of temperature-drop profile the cell outlet temperature $T_{OUT,I}$ is to follow during system standstill. As a result, the estimation accuracy of the residual water content distribution in the hydrogen flow channel 25 declines. In addition, while a temperature-drop profile can be determined to a certain degree when the cell outlet temperature $T_{OUT,I}$ is calculated only once during system standstill, the cell outlet temperature $T_{OUT,I}$ is favorably calculated a plurality of times in order to determine the temperature-drop profile with higher accuracy.

Figure 26:
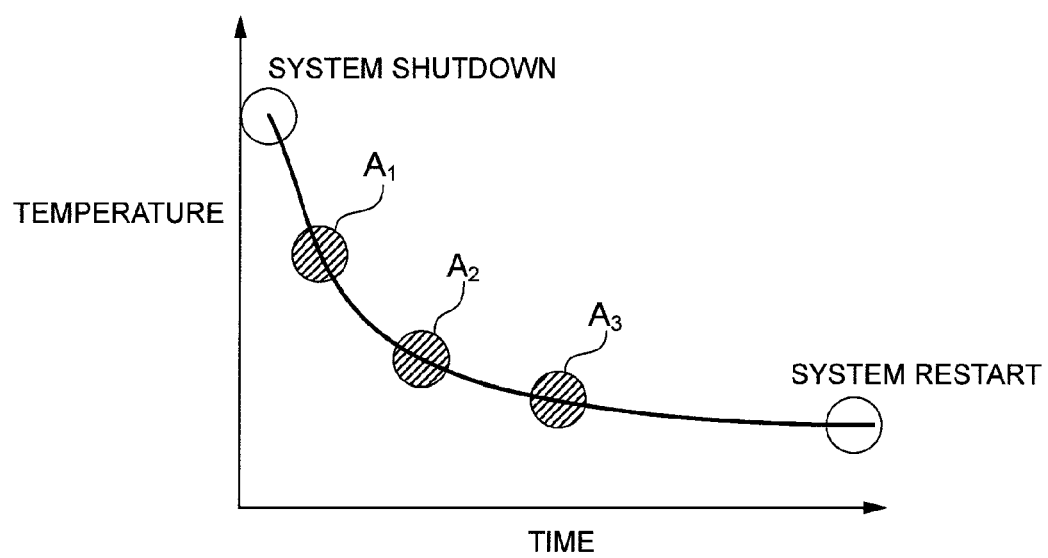
FIG. 26 is a diagram illustrating temperature profiles of a single cell acquired during system standstill according to the embodiment.

Therefore, as illustrated in FIG. 26, in the present embodiment, the cell outlet temperature $T_{OUT,i}$ of each single cell 2 is calculated a plurality of times during system standstill (refer to plots $A_1$ to $A_3$) and a temperature profile representing a time variation of the cell outlet temperature $T_{OUT,i}$ during system standstill is acquired at high accuracy from the results of the plurality of calculations. Subsequently, a change in temperature distribution during system standstill is estimated from the acquired temperature profile, and a water content distribution including the anode-side residual water content distribution during system standstill is estimated using "1. Estimation method of water distribution in a cell plane" described earlier.

Accordingly, with the estimation of the anode-side residual water content during system standstill according to the present embodiment described above, since water transfer during system standstill can be determined with high accuracy, a residual water content in the hydrogen flow channel 25A during system standstill can be estimated with high accuracy. Consequently, countermeasure control (for example, a scavenging process to be described later) corresponding to the residual water content in the hydrogen flow channel 25A can be adequately performed.

Note that, by using a timer during system standstill, the estimation described above (acquiring cell outlet temperature $T_{OUT,I}$ and estimating a residual water content in the hydrogen flow channel 25A based on the acquired cell outlet temperature $T_{OUT,i}$) may be performed only for a given period of time between system shutdown and system restart.

Next, a control example using the aforementioned estimation result of the residual water content in the hydrogen flow channel 25A during system standstill will be described with reference to FIGS. 27A and 27B. The control example involves executing a scavenging process on the hydrogen flow channel 25A when the residual water content in the hydrogen flow channel 25A estimated during system standstill by monitoring the temperature profile described above reaches a predetermined threshold. Control related to the scavenging process is to be executed by the operation control unit 68 upon receiving a signal from the estimating unit 67.

Figure 27A:
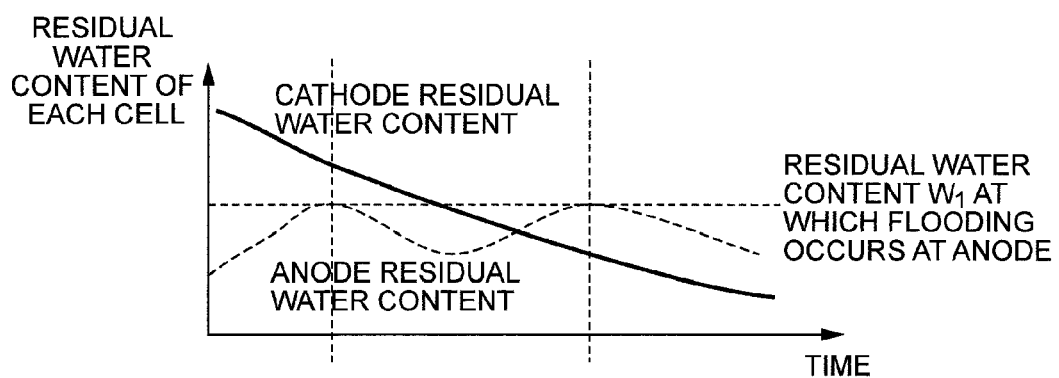
FIG. 27A is a timing chart illustrating a scavenging process during system standstill according to a control example of the present embodiment, wherein a vertical axis represents a residual water content of each cell.
Figure 27B:
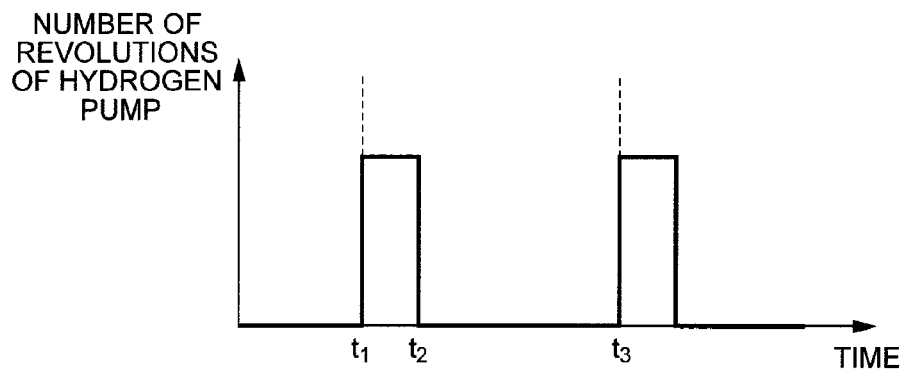
FIG. 27B is a timing chart illustrating the scavenging process during system standstill according to the control example of the present embodiment, wherein a vertical axis represents the number of revolutions of a hydrogen pump.

A vertical axis of FIG. 27A represents a residual water content of a single cell 2. FIG. 27A depicts changes in anode residual water content (an estimated value of a total residual water content in the hydrogen flow channel 25A) and in cathode residual water content (an estimated value of a total residual water content in the air flow channel 25B) in the single cell 2. Residual water content $W_1$ is a threshold that determines whether a scavenging process is to be executed or not and represents a residual water content at which flooding occurs in the hydrogen flow channel 25A.

As illustrated in FIG. 27A, since water transfer occurs as described above during system standstill, the cathode residual water content decreases over time while anode residual water content increases by just that much. In the present control example, as illustrated in FIG. 27B, when the anode residual water content reaches the residual water content $W_1$ (at time $t_1$), the scavenging process is performed by rotating the hydrogen pump 46 for a certain period of time (=time $t_2-t_1$). In this case, an anode residual water content of at least one single cell 2 or the end cell 2a is to be used as the anode residual water content for comparing whether the residual water content $W_1$ has been reached or not. Due to such a scavenging process, gas force-fed from the hydrogen pump 46 carries away liquid water in the hydrogen flow channel 25A and the anode residual water content drops. Subsequently, as depicted at time $t_3$, if the anode residual water content once again reaches the residual water content $W_1$, the hydrogen pump 46 is rotated once again to execute a scavenging process.

As shown, according to the control example of the present embodiment, since a highly accurate water distribution estimation result is used, a scavenging process can be adequately performed during system standstill. Consequently, since there is no more need to perform a countermeasure to an excessive residual water content upon system restart, a contribution can be made towards improving user drivability. In addition, since the hydrogen pump 46 need not be rotated upon system restart for a scavenging process, noise is reduced and NV can be improved. Furthermore, since a deficiency in hydrogen gas supply to the hydrogen flow channel 25A upon system restart can be suppressed, fuel efficiency can be improved. On the other hand, by executing a scavenging process during system standstill, the duration of the scavenging process when performed upon system shutdown and system restart can be reduced.

Note that, in another embodiment, a scavenging process can be performed by supplying an inert gas (for example, nitrogen) to the hydrogen flow channel 25A.

DESCRIPTION OF SYMBOLS

1: fuel cell
2: single cell
2a: end cell
2b: primary cell
23: electrolyte membrane
24A: anode electrode
24B: cathode electrode 25A: hydrogen flow channel (fuel gas flow channel)
25B: air flow channel (oxidation gas flow channel)
67: estimating unit
68: operation control unit
100: fuel cell system
300: air piping system
400: hydrogen piping system
500: coolant piping system
600: controller

The invention claimed is:

1. A fuel cell system comprising:
a fuel cell having a plurality of single cells laminated together, each of the single cells having an anode electrode, a cathode electrode, an electrolyte membrane between the anode electrode and the cathode electrode, a fuel gas flow channel for supplying fuel gas to the anode electrode, and an oxidation gas flow channel for supplying oxidation gas to the cathode electrode; and
a controller including an estimating unit, the controller programmed to estimate a residual water content distribution in the fuel gas flow channel in a cell plane of each single cell, wherein the controller is programmed to consider water transfer that occurs between the anode electrode and the cathode electrode via the electrolyte membrane,
wherein the controller is programmed to estimate a residual water content distribution of the fuel gas flow channel during a standstill, from a shutdown to a restart of the fuel cell system, based on temperature information on each single cell acquired during the standstill.

2. The fuel cell system according to claim 1, further comprising a temperature sensor that detects temperatures related to the fuel cell, wherein the estimating unit calculates a temperature of each single cell using one of the temperatures detected by the temperature sensor.

3. The fuel cell system according to claim 1, wherein the temperature information is a temperature profile that represents a temperature variation of each single cell during the standstill.

4. The fuel cell system according to claim 1, the controller further comprising an operation control unit, the controller programmed to execute a scavenging process on the fuel gas flow channel when the residual water content of the fuel gas flow channel estimated during the standstill exceeds a predetermined residual water content threshold.

5. The fuel cell system according to claim 2, wherein the temperature information is a temperature profile that represents a temperature variation of each single cell during the standstill.

6. The fuel cell system according to claim 2, the controller further comprising an operation control unit, the controller programmed to execute a scavenging process on the fuel gas flow channel when the residual water content of the fuel gas flow channel estimated during the standstill exceeds a predetermined threshold.

7. The fuel cell system according to claim 3, the controller further comprising an operation control unit, the controller programmed to execute a scavenging process on the fuel gas flow channel when the residual water content of the fuel gas flow channel estimated during the standstill exceeds a predetermined threshold.

8. The fuel cell system according to claim 4, wherein the predetermined residual water content threshold represents a residual water content at which flooding occurs in the fuel gas flow channel.

9. A method of operating a fuel cell system comprising a plurality of single cells laminated together, each of the single cells having an anode electrode, a cathode electrode, an electrolyte membrane between the anode electrode and the cathode electrode, a fuel gas flow channel for supplying fuel gas to the anode electrode, and an oxidation gas flow channel for supplying oxidation gas to the cathode electrode, the method comprising:
estimating a residual water content distribution in the fuel gas flow channel in a cell plane of each single cell, while considering water transfer that occurs between the anode electrode and the cathode electrode via the electrolyte membrane; and
estimating a residual water content distribution of the fuel gas flow channel during a standstill, from a shutdown to a restart of the fuel cell system, based on temperature information on each single cell acquired during the standstill.

* * * * *

UNITED STATES PATENT AND TRADEMARK OFFICE
CERTIFICATE OF CORRECTION

PATENT NO. : 8,252,474 B2
APPLICATION NO. : 13/163083
DATED : August 28, 2012
INVENTOR(S) : Masahiro Okuyoshi et al.

Page 1 of 1

It is certified that error appears in the above-identified patent and that said Letters Patent is hereby corrected as shown below:

On the Title Page: Change Item (54) and Col. 1, lines 1-3,
"FUEL CELL SYSTEM" to --AN ESTIMATING UNIT FOR A FUEL CELL SYSTEM FOR ESTIMATING RESIDUAL WATER CONTENT DURING STANDSTILL--.

| Column | Line | |
|---|---|---|
| 5 | 20 | After "fluid." delete "Zone Name: A1,AMD". |
| 6 | 54 | After "sensor" change "knot shown)," to --(not shown),--. |
| 8 | 9 | After "inlet 27a of" delete ",". |
| 8 | 62 | Change "single cell 2," to --single cell 2$_i$--. |
| 8 | 68 | Before "is not used" insert --$T_{in,\,i}$--. |
| 9 | 37 | Change "humidity a" to --humidity α--. |
| 9 | 39 | Change "humidity a" to --humidity α--. |
| 9 | 41 | Change "humidity a" to --humidity α--. |
| 11 | 65 | Change "temperature $T_{our}$" to --temperature $T_{OUT}$--. |
| 12 | 50 | Change "single cell 2," to --single cell 2$_i$--. |

Signed and Sealed this
Twenty-seventh Day of November, 2012

David J. Kappos
*Director of the United States Patent and Trademark Office*